US010425707B2

(12) United States Patent
Sindhu et al.

(10) Patent No.: US 10,425,707 B2
(45) Date of Patent: Sep. 24, 2019

(54) NON-BLOCKING, FULL-MESH DATA CENTER NETWORK HAVING OPTICAL PERMUTORS

(71) Applicant: Fungible, Inc., Santa Clara, CA (US)

(72) Inventors: Pradeep Sindhu, Los Altos Hills, CA (US); Satish Deo, Cupertino, CA (US); Deepak Goel, San Jose, CA (US); Sunil Mekad, Bangalore (IN)

(73) Assignee: FUNGIBLE, INC., Santa Clara, CA (US)

( * ) Notice: Subject to any disclaimer, the term of this patent is extended or adjusted under 35 U.S.C. 154(b) by 0 days.

(21) Appl. No.: 15/938,767

(22) Filed: Mar. 28, 2018

(65) Prior Publication Data

US 2018/0288505 A1 Oct. 4, 2018

Related U.S. Application Data

(60) Provisional application No. 62/478,414, filed on Mar. 29, 2017.

(51) Int. Cl.
*H04J 14/00* (2006.01)
*H04Q 11/00* (2006.01)
(Continued)

(52) U.S. Cl.
CPC ...... *H04Q 11/0005* (2013.01); *H04J 14/0212* (2013.01); *H04L 45/62* (2013.01);
(Continued)

(58) Field of Classification Search
CPC .............................. H04J 14/0282; H04J 14/02
See application file for complete search history.

(56) References Cited

U.S. PATENT DOCUMENTS 8,625,427 B1 1/2014 Terry et al.
9,294,304 B2 3/2016 Slndhu
(Continued)

FOREIGN PATENT DOCUMENTS

EP 1079571 A2 2/2001
EP 2928134 A2 10/2015
(Continued)

OTHER PUBLICATIONS

U.S. Appl. No. 62/559,021, by Pradeep Sindhu et al., filed Sep. 15, 2017.
(Continued)

*Primary Examiner* — David C Payne
*Assistant Examiner* — Pranesh K Barua
(74) *Attorney, Agent, or Firm* — Shumaker & Sieffert, P.A.

(57) ABSTRACT

A network system for a data center is described in which a switch fabric provides full mesh interconnectivity such that any servers may communicate packet data to any other of the servers using any of a number of parallel data paths. Moreover, according to the techniques described herein, edge-positioned access nodes, optical permutation devices and core switches of the switch fabric may be configured and arranged in a way such that the parallel data paths provide single L2/L3hop, full mesh interconnections between any pairwise combination of the access nodes, even in massive data centers having tens of thousands of servers. The plurality of optical permutation devices permute communications across the optical ports based on wavelength so as to provide full-mesh optical connectivity between edge-facing ports and core-facing ports without optical interference.

19 Claims, 7 Drawing Sheets

(51) Int. Cl.
    *H04L 12/863* (2013.01)
    *H04L 12/933* (2013.01)
    *H04L 12/931* (2013.01)
    *H04J 14/02* (2006.01)
    *H04L 12/721* (2013.01)
    *H04L 12/715* (2013.01)

(52) U.S. Cl.
    CPC .......... *H04L 45/64* (2013.01); *H04L 47/6235* (2013.01); *H04L 49/10* (2013.01); *H04L 49/1515* (2013.01); *H04L 49/1523* (2013.01); *H04L 49/1584* (2013.01); *H04L 49/70* (2013.01); *H04Q 11/0066* (2013.01); *H04Q 11/0067* (2013.01); *H04Q 2011/0016* (2013.01); *H04Q 2011/0052* (2013.01); *H04Q 2011/0073* (2013.01)

(56) References Cited

U.S. PATENT DOCUMENTS

| | | | | |
|---|---|---|---|---|
| 2002/0094151 | A1* | 7/2002 | Li | H04L 45/00 385/17 |
| 2002/0118415 | A1* | 8/2002 | Dasylva | H04J 14/02 398/48 |
| 2003/0091271 | A1* | 5/2003 | Dragone | H04Q 11/0005 385/20 |
| 2006/0029323 | A1* | 2/2006 | Nikonov | G02B 6/12004 385/14 |
| 2007/0172235 | A1* | 7/2007 | Snider | B82Y 10/00 398/45 |
| 2008/0138067 | A1* | 6/2008 | Beshai | H04L 49/357 398/45 |
| 2009/0135832 | A1* | 5/2009 | Fan | H04L 12/5602 370/395.4 |
| 2011/0228783 | A1* | 9/2011 | Flynn | G06F 13/4022 370/394 |
| 2013/0191443 | A1* | 7/2013 | Gan | H04L 67/1097 709/203 |
| 2014/0258479 | A1* | 9/2014 | Tenginakai | H04L 41/082 709/220 |
| 2015/0037032 | A1* | 2/2015 | Xu | H04Q 11/0005 398/50 |
| 2015/0117860 | A1* | 4/2015 | Braun | H04J 14/0282 398/58 |
| 2015/0163171 | A1 | 6/2015 | Sindhu et al. | |
| 2015/0180603 | A1* | 6/2015 | Darling | H04J 14/0212 398/49 |
| 2016/0056911 | A1* | 2/2016 | Ye | H04J 14/0267 398/49 |
| 2016/0164625 | A1* | 6/2016 | Gronvall | H04J 14/0282 398/79 |
| 2016/0337723 | A1 | 11/2016 | Graves | |
| 2018/0287818 | A1* | 10/2018 | Goel | H04L 49/70 |

FOREIGN PATENT DOCUMENTS

| | | |
|---|---|---|
| WO | 2013184846 A1 | 12/2013 |
| WO | 2016037262 A1 | 3/2016 |

OTHER PUBLICATIONS

U.S. Appl. No. 62/530,691, by Pradeep Sindhu et al., filed Jul. 10, 2017.
U.S. Appl. No. 15/939,227, by Pradeep Sindhu et al., filed Mar. 28, 2018.
U.S. Appl. No. 62/566,060, by Deepak Goel et al., filed Sep. 29, 2017.
U.S. Appl. No. 62/638,788, by Deepak Goel et al., filed Mar. 5, 2018.
U.S. Appl. No. 15/939,041, by Deepak Goel et al., filed Mar. 28, 2018.
"QFX10000 Switches System Architecture," White Paper, Juniper Networks, Apr. 2015, 15 pp.
International Search Report and Written Opinion of International Application No. PCT/US2018/024879, dated Jun. 22, 2018, 19 pp.
Kaminow, "Optical Integrated Circuits: A Personal Perspective," Journal of Lightwave Technology, vol. 26, No. 9, May 1, 2008, pp. 994-1004.

* cited by examiner

NON-BLOCKING, FULL-MESH DATA CENTER NETWORK HAVING OPTICAL PERMUTORS

This application claims the benefit of U.S. Provisional Appl. No. 62/478,414, filed Mar. 29, 2017, the entire contents of which are incorporated herein by reference.

TECHNICAL FIELD

The invention relates to computer networks and, more particularly, data center network interconnects.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, redundant power supplies, and environmental controls.

In most data centers, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, this disclosure describes data center network systems. Example implementations of network systems for data centers are described in which a switch fabric provides full mesh interconnectivity such that any of the servers may communicate packet data to any other of the servers using any of a number of parallel data paths. In example implementations, the full mesh interconnectivity may be non-blocking and drop-free.

Moreover, according to the techniques described herein, access nodes coupled to the servers, intermediate optical permutation devices, and core switches of the switch fabric may be configured and arranged in a way such that the parallel data paths in the switch fabric provide single L2/L3 hop, full mesh interconnections between any pairwise combination of the access nodes, even in massive data centers having tens of thousands of servers. A plurality of optical permutation devices optically couple the access nodes to the core switches by optical links to communicate the data packets between the access nodes and the core switches as optical signals. Each of the optical permutation devices comprises a set of input optical ports and a set of output optical ports to direct optical signals between the access nodes and the core switches to communicate the data packets. Each of the optical permutation devices is configured such that optical communications received from input optical ports are permuted across the output optical ports based on wavelength so as to provide full-mesh optical connectivity between the edge-facing ports and the core-facing ports without optical interference.

In some example implementations, this disclosure is directed to an optical permutor that operates as an optical interconnect for transporting optical communications between network devices, such as devices within a data center. As described herein, the optical permutor provides a plurality of input ports that receive respective optical input signals, each potentially carrying optical communications at a plurality of different wavelengths. Internal optical elements of the optical permutor are configured such that optical communications received from input ports are "permutated" across output optical ports based on wavelength so as to provide full-mesh connectivity between the ports and in a manner that guarantees no optical interference due to wavelength collision. That is, the optical permutor is configured to ensure that optical communications received from any one of the optical input ports can be directed to any one of the optical output ports without optical interference with any simultaneous communications on any of the other input ports. Moreover, the optical permutor may be bi-directional. In this way, the optical permutors may provide bi-directional, full-mesh point-to-point connectivity for transporting optical communications.

In one example, a network system comprises a plurality of servers, a switch fabric comprising a plurality of core switches, a plurality of access nodes, each of the access nodes coupled to a subset of the servers to communicate data packets with the servers, and a plurality of optical permutation devices optically coupling the access nodes to the core switches by optical links to communicate the data packets between the access nodes and the core switches as optical signals. Each the optical permutation devices comprises a set of input optical ports and a set of output optical ports to direct optical signal between the access nodes and the core switches to communicate the data packets. Moreover, each of the optical permutation devices is configured such that optical communications received from the input optical ports are permuted across the output optical ports based on wavelength so as to provide full-mesh optical connectivity between the input optical ports and the output optical ports without optical interference.

In another example, a method comprises interconnecting a plurality of servers of a data center by an intermediate network comprising: a switch fabric comprising a plurality of core switches; a plurality of access nodes, each of the access nodes coupled to a subset of the servers to communicate data packets with the servers; and a plurality of optical permutation devices optically coupling the access nodes to the core switches by optical links to communicate the data packets between the access nodes and the core switches as optical signals. Each of the optical permutation device comprise a set of input optical ports and a set of output optical ports to direct optical signal between the access nodes and the core switches to communicate the data packets, and each of the optical permutation devices is configured such that optical communications received from the input optical ports are permuted across the output optical ports based on wavelength to provide full-mesh optical connectivity between the input optical ports and the output optical ports without optical interference. Moreover, the access nodes, the core switches, and the optical permutation devices are configured to provide a plurality of parallel data paths between each pairwise combination of the access nodes. The method further comprises communicating a packet flow between the servers including spraying, with the access nodes, packets of the packet flow across the plurality of parallel data paths between the access nodes, and reordering, with the access nodes, the packets into the packet flow and delivering the reordered packets.

In another example, a method comprises receiving packet communications with a set of optical input ports of an optical permutation device, wherein the set of optical input ports couple the optical permutation device to a set of access nodes positioned between the optical permutation device and a set of servers with a packet-based network. The method further comprises permuting the packet-based communications across a set of output optical ports of the optical permutor based on wavelength to provide full-mesh optical connectivity between the input optical ports and the output optical ports of the optical permutor without optical interference, and forwarding, with the optical permutor and by the set of output ports, the permuted packet-based communications toward a set of one or more switches within the networks.

In another example, an optical permutation device comprises a plurality of the input optical ports to receive respective optical signals, wherein the respective optical signals comprise optical communications at a plurality of different wavelengths. The optical permutation device further comprises a plurality of the output optical ports to output optical signals; and a set of optical elements arranged to provide optical interconnection between the optical input ports and the optical output ports. The set of optical elements are configured to direct a respective unique and non-interfering permutation of the wavelengths from the input optical ports to the output optical ports.

The details of one or more examples are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
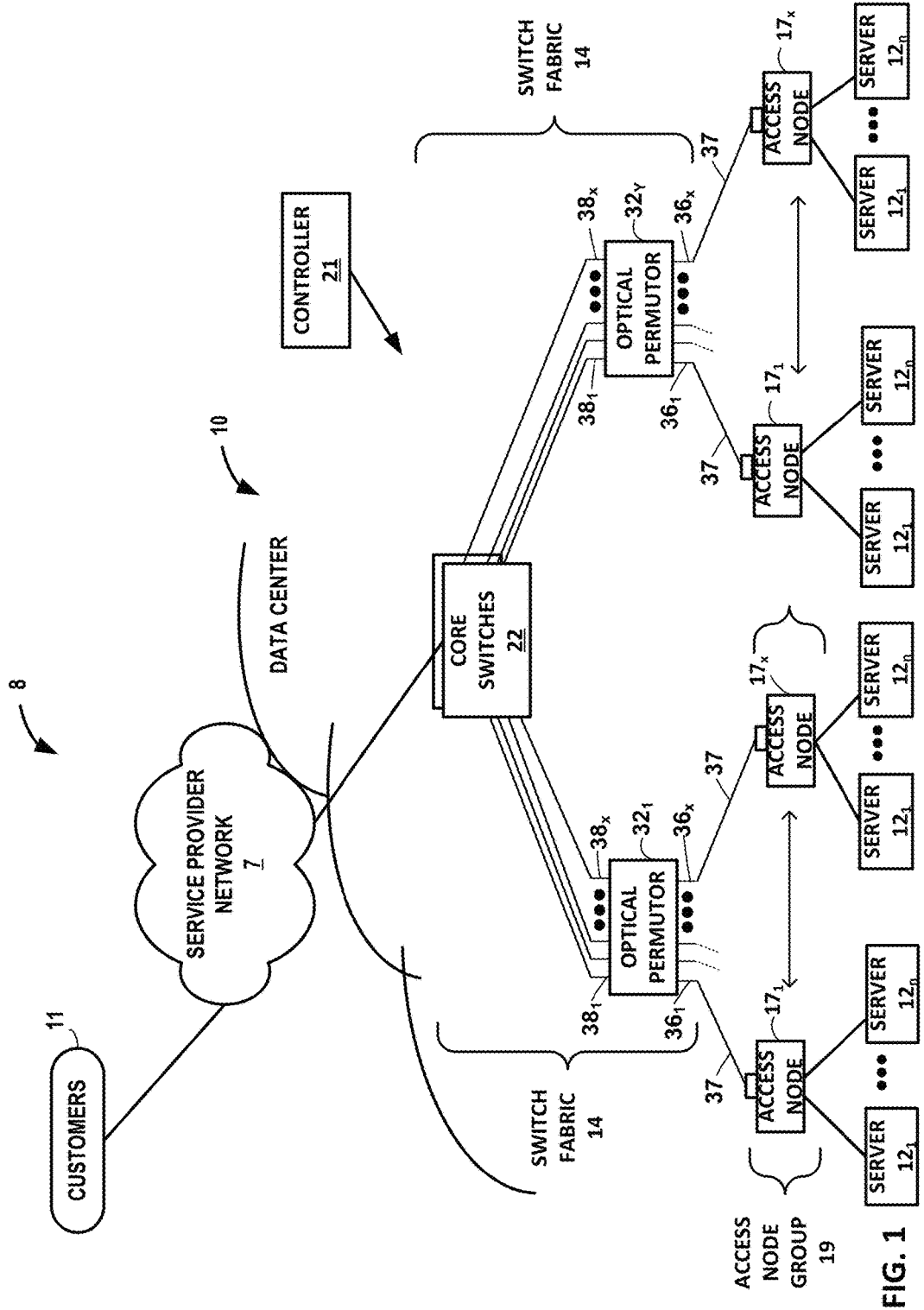
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by content/service provider network 7. In other examples, content/service provider network 7 may be a data center wide area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on.

In this example, data center 10 includes a set of storage systems and application servers 12 interconnected via high-speed switch fabric 14. In some examples, servers 12 are arranged into multiple different server groups, each including any number of servers up to, for example, n servers $12_1$-$12_n$. Servers 12 provide execution and storage environments for applications and data associated with customers 11 and may be physical servers, virtual machines, virtualized containers or combinations thereof.

In the example of FIG. 1, each of servers 12 is coupled to switch fabric 14 by an access node 17. As further described herein, in one example, each access node 17 is a highly programmable I/O processor specially designed for offloading certain stream processing functions, such as from servers 12. In one example, each of access nodes 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 18 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Access nodes 17 may also be referred to as data processing units (DPUs), or devices including DPUs. In other words, the term access node may be used herein interchangeably with the term DPU. Additional example details of various example access nodes are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference.

In some examples, access nodes 17 may be arranged into multiple different access node groups 19, each including any number of access nodes up to, for example, x access nodes $17_1$-$17_x$. As shown in FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing network interfaces for communicating toward a respective group of servers 12 and one or more core-facing optical interfaces for communicating toward core switches 22. In one example, core switches 22 comprise a set of interconnected, high-performance yet off-the-shelf silicon-based packet routers and switches that implement industry standard protocols. In some example implementations, each core switch may maintain the same routing table that defines forwarding information for switching packets between ports based on the destination of the packets. The routing table may be statically programmed, learned by way of routing protocols, configured by a network management system, configured by controller 21 or other means.

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing electrical or optical local bus interfaces for communicating with a respective group of servers 12 and one or more core-facing electrical or optical interfaces for communicating with core switches 22 within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Although not shown in FIG. 1, access nodes 17 may be directly coupled to each other, such as direct coupling between access nodes in a common access node group 19, to provide direct interconnectivity between the access nodes of the same group. For example, multiple access nodes 17 (e.g., 4 access nodes) may be positioned within a common access node group 19 for servicing a group of servers (e.g., 16 servers). More details on the data center network architecture and interconnected access nodes are available in U.S. Provisional Patent Application No. 62/514,583, filed Jun. 2, 2017, entitled "Non-Blocking Any-to-Any Data Center Network with Packet Spraying Over Multiple Alternate Data Paths," the entire content of which is incorporated herein by reference.

As described herein, switch fabric 14 includes a set of optical permutors $32_1$-$32_Y$ (herein, "optical permutors 32"), also referred to as optical permutation devices, connected to a set of core packet-based switches 22 that collectively provide full mesh point-to-point connectivity between servers 12. As further explained, optical permutors 32 are optical interconnect devices that transport optical signals between access nodes 17 and core switches 22 by utilizing wavelength division multiplexing such that communications for servers 12 of the same server group may be conveyed through a common optical fiber 37. For example, each access node 17 may utilize different wavelengths for conveying communications for servers 12 of the same server group. In the example of in FIG. 1, each optical permutor 32 includes a set of edge-facing optical interfaces $36_1$-$36_x$ for optical communication with a respective group of access nodes $17_1$-$17_x$ and a set of core-facing optical interfaces $38_1$-$38_x$ for communicating with core switches 22. Although each optical permutor 32 is illustrated in FIG. 1 as including the same number, x, of access nodes 17 and edge-facing optical interfaces 36, in other examples each optical permutor 32 may include optical interfaces 36 that are each capable of coupling to more than one optical fiber 37. In this other example, each optical permutor 32 may include a set of edge-facing optical interfaces $36_1$-$36_x$ for optical communication with an integer multiple of x, e.g., 2×, 3×, or 4×, of access nodes 17.

Furthermore, as described herein, each optical permutor 32 is configured such that optical communications received from downstream ports 36 are "permuted" across upstream ports 38 based on wavelength so as to provide full-mesh connectivity between the upstream and downstream ports without any optical interference. That is, each optical permutor 32 is configured to ensure that optical communications received from any one of downstream servers 12 can be directed to any upstream-facing optical ports 38 without optical interference with any simultaneous communications from any other server 12. Moreover, optical permutors 32 may be bi-directional, i.e., similarly configured to permute communications from upstream ports 38 across downstream ports 36 such that no optical interference occurs on any of the downstream ports. In this way, optical permutors 32 provide bi-directional, full-mesh point-to-point connectivity for transporting communications for servers 12 to/from core switches 22.

For example, optical permutor $32_1$ is configured to optically direct optical communications from downstream-facing ports $36_1$-$36_x$ out upstream-facing ports $38_1$-$38_x$ such that each upstream port 38 carries a different one of the possible unique permutations of the combinations of downstream-facing ports 36 and the optical frequencies carried by those ports, where no single upstream-facing port 38 carries communications from servers 12 associated with the same wavelength. As such, in this example, each upstream-facing port 38 carries a non-interfering wavelength from each of the downstream facing ports 36, thus allowing a full mesh of communication. In FIG. 1, each of the downstream-facing optical ports 36 of each optical permutor 32 receives an optical signal carrying, in this example, up to N wavelengths for up to N servers of a server group. As one example, port $36_1$ of optical permutor $32_1$ may receive an optical signal from access node $17_1$, carrying communications as N different wavelengths, where each wavelength is reserved for communications associated with a different one of servers 12 of the server group coupled to access node $17_1$. Optical permutor $32_1$ directs the optical communications from downstream-facing ports 36 to upstream-facing ports 38 such that each upstream-facing port 38 carries a different unique permutation of the optical frequencies/down-stream port combinations and where no upstream-facing port 38 carries communications from servers 12 associated with the same wavelength. Moreover, optical permutor $32_1$ may similarly be configured in a bi-directional manner to permute communications from upstream-facing ports $38_1$-$38_x$ across downstream-facing ports $36_1$-$36_x$ and so that no downstream-facing port 36 carries communications associated with the same wavelength, thereby providing full bi-directional, full-mesh point-to-point connectivity for transporting communications for servers 12 to/from core switches 22.

In this way, switch fabric 14 may provide full mesh interconnectivity such that any of servers 12 may communicate packet data to any other of the servers 12 using any of a number of parallel data paths. Moreover, according to the techniques described herein, switch fabric 14 may be configured and arranged in a way such that the parallel data paths in switch fabric 14 provides single L2/L3 hop, full mesh interconnections (bipartite graph) between servers 12, even in massive data centers having tens of thousands of servers. In some example implementations, each access node 17 may logically be connected to each core switch 22 and, therefore, have multiple parallel data paths for reaching any given other access node and the servers 12 reachable through those access nodes. As such, in this example, for M core switches 22, M possible data paths exist between each access node 17. Each access node 17 may be viewed as effectively connected to each core switch 22 and thus any access node sourcing traffic into switch fabric 14 may reach any other access node 17 by a single, one-hop L3 lookup by an intermediate device (core switch).

Further, in some embodiments, rather than being limited to flow-based routing and switching, switch fabric 14 may be configured such that access nodes 17 may, for any given packet flow between servers 12, spray the packets of a packet flow across all or a subset of the parallel data paths of switch fabric 14 by which a given destination access node 17 for a destination server 12 can be reached. An access node 17 sourcing a packet flow for a source server 12 may use any technique for spraying the packets across the available parallel data paths, such as random, round-robin, hash-based or other mechanism that may be designed to maximize, for example, utilization of bandwidth or otherwise avoid congestion. In some example implementations, flow-based load balancing need not necessarily be utilized and more effective bandwidth utilization may be used by allowing packets of a given packet flow (five tuple) sourced by a server 12 to traverse different paths of switch fabric 14 between access nodes 17 coupled to the source and destinations servers. The respective destination access node 17 associated with the destination server 12 may be configured to reorder the variable length IP packets of the packet flows and deliver the packets to the destination server in reordered sequence.

In this way, according to the techniques herein, example implementations are described in which access nodes 17 interface and utilize switch fabric 14 so as to provide full mesh (any-to-any) interconnectivity such that any of servers 12 may communicate packet data for a given packet flow to any other of the servers using any of a number of parallel data paths within the data center 10. For example, example network architectures and techniques are described in which access nodes, in example implementations, spray individual packets for packet flows between the access nodes and across some or all of the multiple parallel data paths in the data center switch fabric 14 and reorder the packets for delivery to the destinations so as to provide full mesh connectivity.

As described herein, the techniques of this disclosure introduce a new data transmission protocol referred to as a Fabric Control Protocol (FCP) that may be used by the different operational networking components of any of access nodes 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide any of the advantages and techniques described herein, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

Although not shown in FIG. 1, access nodes 17 may be directly coupled, such as access nodes in a common rack, so as to provide direct interconnectivity between the access nodes of the same group. For example, multiple access nodes 17 (e.g., 4) may be positioned within a common server rack holding multiple (e.g., 4) sets of server groups (e.g., 16 servers per server group; 64 servers per rack) along with one or more optical permutors 32. Each access node 17 of the rack may be interconnected to the other access nodes of the rack and coupled to the optical permutors 32 of the rack, which are in turn coupled to one or more core switches 22 that interconnect multiple server racks. In one example, each access node 17 may be implemented as one or more application-specific integrated circuit (ASIC) or other hardware and software components, each supporting a subset of the servers.

In some examples, multiple access nodes 17 may be grouped (e.g., within a single electronic device or appliance), referred to herein as an access node group 19, for providing connectivity to a group of servers supported by the set of access nodes internal to the device. In one example, an access node group 19 may comprise four access nodes 17, each supporting four servers so as to support a group of sixteen servers. As one example, each access node 17 may support eight 100 Gigabit Ethernet interfaces for communicating with other access nodes 17 or an optical permutor 32, and a 6×16-lane (i.e., a "96 lane") PCIe interface for communicating with servers 12.

In one example, each access node 17 implements four different operational components or functions: (1) a source component operable to receive traffic from server 12, (2) a source switching component operable to switch source traffic to other source switching components of different access nodes 17 (possibly of different access node groups) or to core switches 22, (3) a destination switching component operable to switch inbound traffic received from other source switching components or from cores switches 22 and (4) a destination component operable to reorder packet flows and provide the packet flows to destination servers 12.

In this example, servers 12 are connected to source components of the access nodes 17 to inject traffic into the switch fabric 14, and servers 12 are similarly coupled to the destination component within the access nodes 17 to receive traffic therefrom. Because of the full-mesh, parallel data paths provided by switch fabric 14, each source switching component and destination switching component within a given access node 17 need not perform L2/L3 switching. Instead, access nodes 17 may apply spraying algorithms to spray packets of a packet flow, e.g., randomly, round-robin, based on QoS/scheduling or otherwise to efficiently forward packets without requiring packet analysis and lookup operations. Destination switching components of the ASICs may provide a limited lookup necessary only to select the proper output port for forwarding packets to local servers 12. As such, with respect to full routing tables for the data center, only core switches 22 may need to perform full lookup operations. Thus, switch fabric 14 provides a highly-scalable, flat, high-speed interconnect in which servers 12 are effectively one L2/L3 hop from any other server 12 within the data center.

In the example of FIG. 1, software-defined networking (SDN) controller 21 provides a high-level controller for configuring and managing routing and switching infrastructure of data center 10. SDN controller 21 provides a logically and in some cases physically centralized controller for facilitating operation of one or more virtual networks within data center 10 in accordance with one or more embodiments of this disclosure. In some examples, SDN controller 21 may operate in response to configuration input received from a network administrator. In some examples, SDN controller 21 operates to configure access nodes 17 to logically establish one or more virtual fabrics as overlay networks dynamically configured on top of the physical underlay network provided by switch fabric 14, in accordance with the techniques described herein. For example, SDN controller 21 may learn and maintain knowledge of access nodes 21 and establish a communication control channel with each of the access nodes. SDN controller 21 uses its knowledge of access nodes 17 to define multiple sets (groups) of two of more access nodes 17 to establish different virtual fabrics over switch fabric 14. More specifically, SDN controller 21 may use the communication control channels to notify each of access nodes 17 for a given set which other access nodes are included in the same set. In response, access nodes 17 dynamically setup FCP tunnels with the other access nodes included in the same set as a virtual fabric over packet switched network 410. In this way, SDN controller 21 defines the sets of access nodes 17 for each of the virtual fabrics, and the access nodes are responsible for establishing the virtual fabrics. As such, underlay components of switch fabric 14 may be unaware of virtual fabrics. In these examples, access nodes 17 interface with and utilize switch fabric 14 so as to provide full mesh (any-to-any) interconnectivity between access nodes of any given virtual fabric. In this way, the servers connected to any of the access nodes forming a given one of virtual fabrics may communicate packet data for a given packet flow to any other of the servers coupled to the access nodes for that virtual fabric using any of a number of parallel data paths within switch fabric 14 that interconnect the access nodes of that virtual fabric. More details of access nodes operating to spray packets within and across virtual overlay networks are available in U.S. Provisional Patent Application No. 62/638, 788, filed Mar. 5, 2018, entitled "NETWORK ACCESS NODE VIRTUAL FABRICS CONFIGURED DYNAMICALLY OVER AN UNDERLAY NETWORK," the entire content of which is incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

As one example, each access node group 19 of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and servers 12 may be integrated in a suitable size (e.g., 10RU) frame that may, in such an example, become a network storage compute unit (NSCU) for data center 10. For example, an access node 17 may be integrated within a mother board of a server 12 or otherwise co-located with a server in a single chassis.

The techniques may provide certain advantages. For example, the techniques may increase significantly the bandwidth utilization of the underlying switch fabric 14. Moreover, in example implementations, the techniques may provide full mesh interconnectivity between the servers of the data center and may nevertheless be non-blocking and drop-free.

Although access nodes 17 are described in FIG. 1 with respect to switch fabric 14 of data center 10, in other examples, access nodes may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the access nodes. The packet switched network may use any technology, including IP over Ethernet as well as other technologies. Irrespective of the type of packet switched network, in accordance with the techniques described in this disclosure, access nodes may spray individual packets for packet flows between the access nodes and across multiple parallel data paths in the packet switched network and reorder the packets for delivery to the destinations so as to provide full mesh connectivity.

Figure 2A:
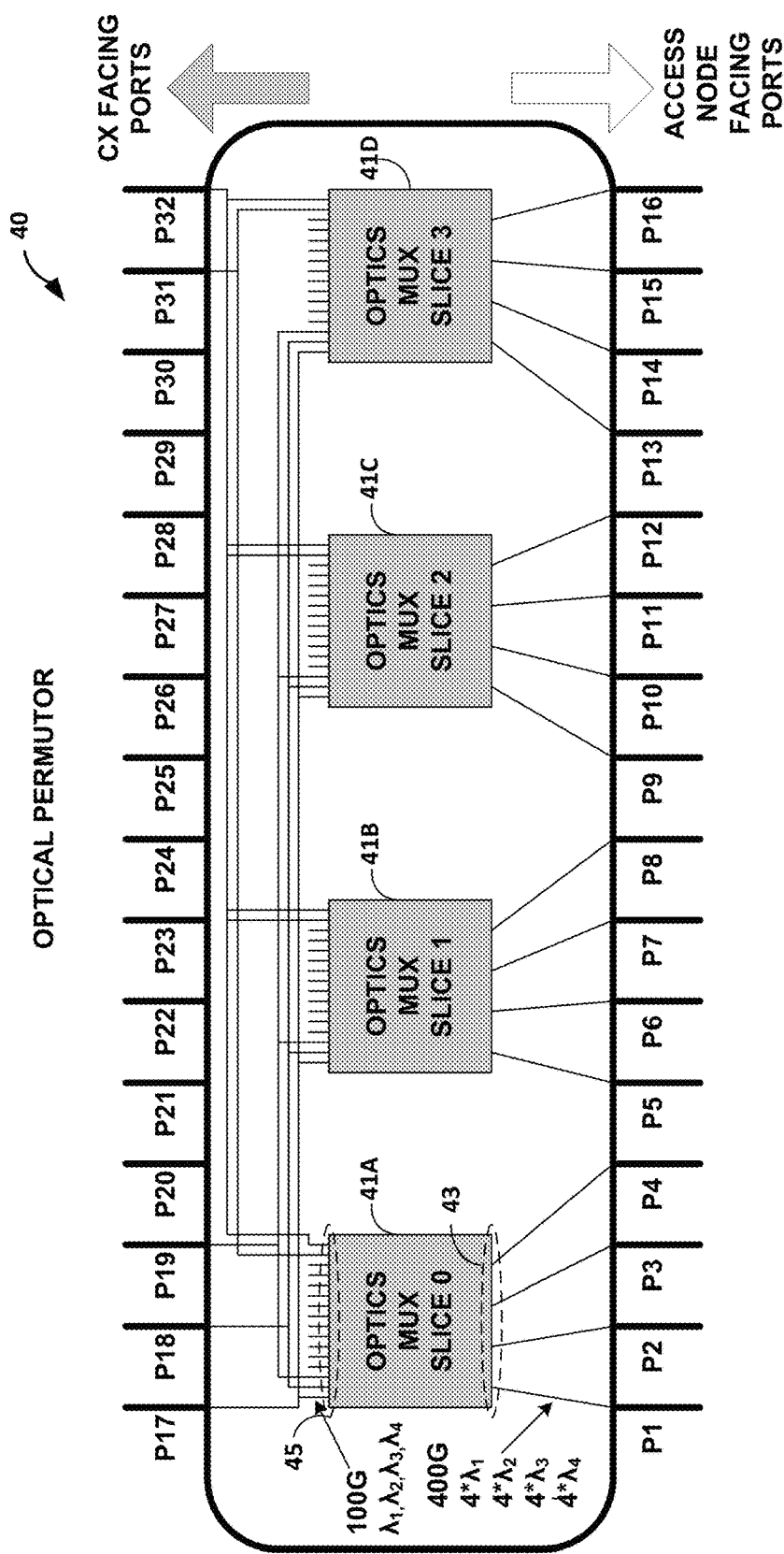
FIG. 2A is a block diagram illustrating an example optical permutor in accordance with the techniques described herein.

FIG. 2A is a block diagram illustrating an example optical permutor 40, which may be any of optical permutors 32 of FIG. 1. In this example, optical permutor 40 includes a plurality of bidirectional input ports (P1-P32) that each send and receive respective optical signals. In this example, optical permutor 40 includes 32 optical ports with P1-P16 being access node-facing ports for optically coupling to access nodes 17 and ports P17-P32 being core switch-facing ports for optically coupling with core switches 22. In one particular example, each port comprises a bidirectional 400 Gigabit optical interface capable of coupling to four 100 Gigabit single-mode optical fiber (SMF) pairs, each fiber carrying four 25G wavelengths $\lambda_1, \lambda_2, \lambda_3, \lambda_4$. As such, in this example, each port P1-P32 provides 400 Gigabit optical bandwidth. The described example architecture readily scales and may support, for example, 200 and 400 Gigabit fibers carrying four (or more) 50G and 100G wavelengths, respectively.

In the example of FIG. 2A, optical permutor 40 includes four optical multiplexors/demultiplexors ("Optics Mux Slice 0-3" in FIG. 2A) 41A-41D (herein, "Optics Mux Slice 41") having four 400G access node-facing optical ports 43 and sixteen core switch-facing 100G optical ports 45. As shown in more detail in FIG. 2B, each optics mux slice 41 receives the optical signals carried by SMFs for the set of four optical ports 43, splits the four wavelengths in the optical signal for each SMF and sprays the wavelengths carried by each SMF in a 4×4 spray across the set of sixteen optical ports 45.

Figure 2B:
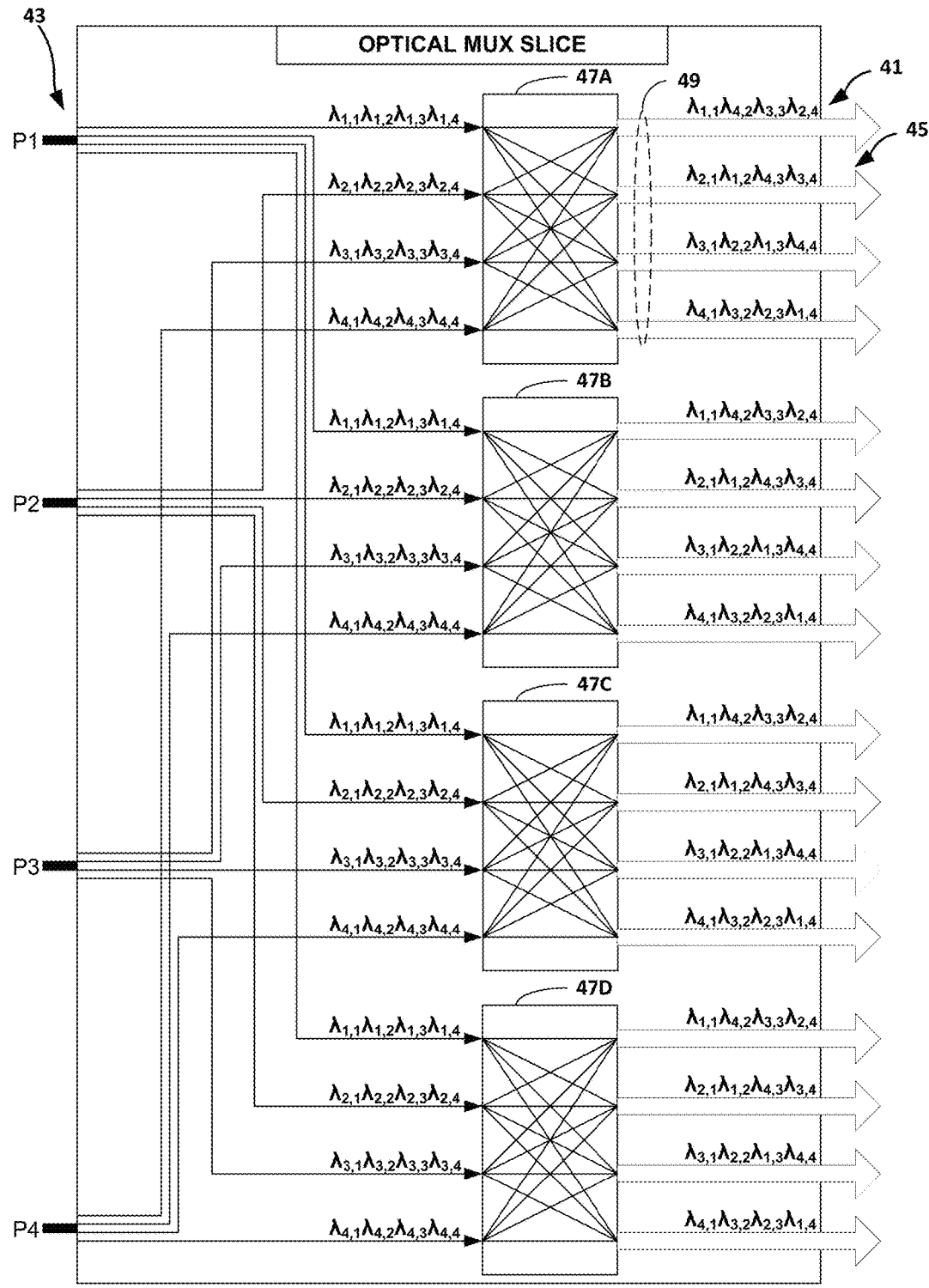
FIG. 2B is a block diagram showing, in further detail, an example implementation of example multiplexor slices of the example optical permutor of FIG. 2A.

FIG. 2B is a block diagram illustrating in further detail an example of an optics mux slice 41 of FIG. 2A. In the example of FIG. 2B, each optics mux slice 41 includes four optical mux/demux chips 47A-47D (herein, "optical mux/demux chips 47"). Each of the optical mux/demux chips 47 receives an optical signal from one of the SMFs for each of the different inputs ports (P) serviced by the optical mux slice 41, such as ports P1-P4 for optics mux slice 41A of FIG. 2A. Each of the optical mux/demux chips 47 splits the four wavelengths in the optical signal for each SMF and sprays the wavelengths carried by each SMF in 4×4 spray across a set of four optical ports 49.

For example, in FIG. 2B, each optical communication is designated as $\lambda_{p,w}$, where the subscript p represents the port and the subscript w represents a different wavelength. Thus, using this nomenclature, port P1 of optics mux slice 41 receives a light beam carrying communications at n different wavelengths designated $\lambda_{1,1}$, $\lambda_{1,2}$, $\lambda_{1,3}$, and $\lambda_{1,4}$ where, in this example, n equals 4. Similarly, optical port P2 receives a light beam carrying communications at n different wavelengths designated $\lambda_{2,1}$, $\lambda_{2,2}$, $\lambda_{2,3}$, and $\lambda_{2,4}$. As shown, each optical mux/demux chips 47A-47D receive an optical signal carrying $\lambda_{1,1}$, $\lambda_{1,2}$, $\lambda_{1,3}$, and $\lambda_{1,4}$ from port P1, an optical signal carrying $\lambda_{2,1}$, $\lambda_{2,2}$, $\lambda_{2,3}$, and $\lambda_{2,4}$ from port P2, an optical signal carrying $\lambda_{3,1}$, $\lambda_{3,2}$, $\lambda_{3,3}$, and $\lambda_{3,4}$ from port P3 and an optical signal carrying $\lambda_{4,1}$, $\lambda_{4,2}$, $\lambda_{4,3}$, and $\lambda_{4,4}$ from port P4. Each of the optical mux/demux chips 47 splits the four wavelengths in the optical signal for each SMF and sprays the wavelengths carried by each SMF such that optical ports 49 each carry a different one of the possible unique permutations of the combinations of optical input ports P1-P4 and the optical wavelengths carried by those ports and where no single optical output port 49 carries multiple optical communications having the same wavelength. For example, as shown in FIG. 2B, a set of four (4) optical output ports 49 for any given optical mux/demux chip 47 may output an optical signal of wavelengths $\lambda_{1,1}$, $\lambda_{4,2}$, $\lambda_{3,3}$, and $\lambda_{2,4}$ on a first port, an optical signal carrying wavelengths $\lambda_{2,1}$, $\lambda_{1,2}$, $\lambda_{4,3}$, and $\lambda_{3,4}$ on a second port, an optical signal carrying $\lambda_{3,1}$, $\lambda_{2,2}$, $\lambda_{1,3}$, and $\lambda_{4,4}$ on a third optical port and an optical signal carrying $\lambda_{4,1}$, $\lambda_{3,2}$, $\lambda_{2,3}$, and $\lambda_{4,4}$ on a fourth port.

The following provides a complete example for one implementation of optical permutor 40 of FIGS. 1, 2A-2B. In this example, each of ports P1-P32 comprise four separate single mode optical fibers pairs (designated F1-F4 for each port). That is, each port P1-P32 of optical permutor 40 comprises an input optical interface configured to receive four separate fibers, such as a 400G optical interface configured to couple to and receive optical signals from four separate 100G optical fibers. In addition, each port P1-P32 of optical permutor 40 comprises an output optical interface configured to connect to and transmit optical signals on four separate fibers, such as a 400G optical interface configured to receive four separate 100G optical fibers.

Further, each of the four optical fiber pairs for each of input ports P1-P16 is coupled to a different access node 17, thereby providing bidirectional optical connectivity from 64 different access nodes. Moreover, in this example, each access node utilizes four different wavelengths (L1-L4) for communications associated with servers 12 so as to support parallel communications for up to four servers per access node.

Table 1 lists one example configuration for optical permutor 40 for optical communications in the core-facing direction. That is, Table 1 illustrates an example configuration of optical permutor 40 for producing, on the optical fibers of core-facing output ports P17-P32, a set of 64 unique permutations for combinations of optical input ports P1-P16 and optical wavelengths L1-L4 carried by those input ports, where no single optical output port carries multiple optical communications having the same wavelength. For example, the first column of Table 1 lists the wavelengths L1-L4 carried by the four fibers F1-F4 of each input optical interfaces for ports P0-P16 while the right column lists the unique and non-interfering permutation of input port fiber/wavelength combination output on each optical output interface of ports P17-P32.

TABLE 1

| Rack-facing Input ports for Optical Permutor | Core-switch facing Output Ports for Optical Permutor (permutation of wavelengths & input port) |
|---|---|
| Input Port 1: | Output Port 17: |
| Fiber 1: P1F1L1-P1F1L4 | Fiber 1: P1F1L1, P2F1L2, P3F1L3, P4F1L4 |
| Fiber 2: P1F2L1-P1F2L4 | Fiber 2: P5F1L1, P6F1L2, P7F1L3, P8F1L4 |
| Fiber 3: P1F3L1-P1F3L4 | Fiber 3: P9F1L1, P10F1L2, P11F1L3, P12F1L4 |
| Fiber 4: P1F4L1-P1F4L4 | Fiber 4: P13F1L1, P14F1L2, P15F1L3, P16F1L4 |
| Input Port 2: | Output Port 18: |
| Fiber 1: P2F1L1-P2F1L4 | Fiber 1: P1F2L1, P2F2L2, P3F2L3, P4F2L4 |
| Fiber 2: P2F2L1-P2F2L4 | Fiber 2: P5F2L1, P6F2L2, P7F2L3, P8F2L4 |
| Fiber 3: P2F3L1-P2F3L4 | Fiber 3: P9F2L1, P10F2L2, P11F2L3, P12F2L4 |
| Fiber 4: P2F4L1-P2F4L4 | Fiber 4: P13F2L1, P14F2L2, P15F2L3, P16F2L4 |
| Input Port 3: | Output Port 19: |
| Fiber 1: P3F1L1-P3F1L4 | Fiber 1: P1F3L1, P2F3L2, P3F3L3, P4F3L4 |
| Fiber 2: P3F2L1-P3F2L4 | Fiber 2: P5F3L1, P6F3L2, P7F3L3, P8F3L4 |
| Fiber 3: P3F3L1-P3F3L4 | Fiber 3: P9F3L1, P10F3L2, P11F3L3, P12F3L4 |
| Fiber 4: P3F4L1-P3F4L4 | Fiber 4: P13F3L1, P14F3L2, P15F3L3, P16F3L4 |
| Input Port 4: | Output Port 20: |
| Fiber 1: P4F1L1-P4F1L4 | Fiber 1: P1F4L1, P2F4L2, P3F4L3, P4F4L4 |
| Fiber 2: P4F2L1-P4F2L4 | Fiber 2: P5F4L1, P6F4L2, P7F4L3, P8F4L4 |
| Fiber 3: P4F3L1-P4F3L4 | Fiber 3: P9F4L1, P10F4L2, P11F4L3, P12F4L4 |
| Fiber 4: P4F4L1-P4F4L4 | Fiber 4: P13F4L1, P14F4L2, P15F4L3, P16F4L4 |
| Input Port 5: | Output Port 21: |
| Fiber 1: P5F1L1-P5F1L4 | Fiber 1: P2F1L1, P3F1L2, P4F1L3, P5F1L4 |
| Fiber 2: P5F2L1-P5F2L4 | Fiber 2: P6F1L1, P7F1L2, P8F1L3, P9F1L4 |
| Fiber 3: P5F3L1-P5F3L4 | Fiber 3: P10F1L1, P11F1L2, P12F1L3, P13F1L4 |
| Fiber 4: P5F4L1-P5F4L4 | Fiber 4: P14F1L1, P15F1L2, P16F1L3, P1F1L4 |
| Input Port 6: | Output Port 22: |
| Fiber 1: P6F1L1-P6F1L4 | Fiber 1: P2F2L1, P3F2L2, P4F2L3, P5F2L4 |

TABLE 1-continued

| Rack-facing Input ports for Optical Permutor | Core-switch facing Output Ports for Optical Permutor (permutation of wavelengths & input port) |
|---|---|
| Fiber 2: P6F2L1-P6F2L4 | Fiber 2: P6F2L1, P7F2L2, P8F2L3, P9F2L4 |
| Fiber 3: P6F3L1-P6F3L4 | Fiber 3: P10F2L1, P11F2L2, P12F2L3, P13F2L4 |
| Fiber 4: P6F4L1-P6F4L4 | Fiber 4: P14F2L1, P15F2L2, P16F2L3, P1F2L4 |
| Input Port 7: | Output Port 23: |
| Fiber 1: P7F1L1-P7F1L4 | Fiber 1: P2F3L1, P3F3L2, P4F3L3, P5F3L4 |
| Fiber 2: P7F2L1-P7F2L4 | Fiber 2: P6F3L1, P7F3L2, P8F3L3, P9F3L4 |
| Fiber 3: P7F3L1-P7F3L4 | Fiber 3: P10F3L1, P11F3L2, P12F3L3, P13F3L4 |
| Fiber 4: P7F4L1-P7F4L4 | Fiber 4: P14F3L1, P15F3L2, P16F3L3, P1F3L4 |
| Input Port 8: | Output Port 24: |
| Fiber 1: P8F1L1-P8F1L4 | Fiber 1: P2F4L1, P3F4L2, P4F4L3, P5F4L4 |
| Fiber 2: P8F2L1-P8F2L4 | Fiber 2: P6F4L1, P7F4L2, P8F4L3, P9F4L4 |
| Fiber 3: P8F3L1-P8F3L4 | Fiber 3: P10F4L1, P11F4L2, P12F4L3, P13F4L4 |
| Fiber 4: P8F4L1-P8F4L4 | Fiber 4: P14F4L1, P15F4L2, P16F4L3, P1F4L4 |
| Input Port 9: | Output Port 25: |
| Fiber 1: P9F1L1-P9F1L4 | Fiber 1: P3F1L1, P4F1L2, P5F1L3, P6F1L4 |
| Fiber 2: P9F2L1-P9F2L4 | Fiber 2: P7F1L1, P8F1L2, P9F1L3, P10F1L4 |
| Fiber 3: P9F3L1-P9F3L4 | Fiber 3: P11F1L1, P12F1L2, P13F1L3, P14F1L4 |
| Fiber 4: P9F4L1-P9F4L4 | Fiber 4: P15F1L1, P16F1L2, P1F1L3, P2F1L4 |
| Input Port 10: | Output Port 26: |
| Fiber 1: P10F1L1-P10F1L4 | Fiber 1: P3F2L1, P4F2L2, P5F2L3, P6F2L4 |
| Fiber 2: P10F2L1-P10F2L4 | Fiber 2: P7F2L1, P8F2L2, P9F2L3, P10F2L4 |
| Fiber 3: P10F3L1-P10F3L4 | Fiber 3: P11F2L1, P12F2L2, P13F2L3, P14F2L4 |
| Fiber 4: P10F4L1-P10F4L4 | Fiber 4: P15F2L1, P16F2L2, P1F2L3, P2F2L4 |
| Input Port 11: | Output Port 27: |
| Fiber 1: P11F1L1-P11F1L4 | Fiber 1: P3F3L1, P4F3L2, P5F3L3, P6F3L4 |
| Fiber 2: P11F2L1-P11F2L4 | Fiber 2: P7F3L1, P8F3L2, P9F3L3, P10F3L4 |
| Fiber 3: P11F3L1-P11F3L4 | Fiber 3: P11F3L1, P12F3L2, P13F3L3, P14F3L4 |
| Fiber 4: P11F4L1-P11F4L4 | Fiber 4: P15F3L1, P16F3L2, P1F3L3, P2F3L4 |
| Input Port 12: | Output Port 28: |
| Fiber 1: P12F1L1-P12F1L4 | Fiber 1: P3F4L1, P4F4L2, P5F4L3, P6F4L4 |
| Fiber 2: P12F2L1-P12F2L4 | Fiber 2: P7F4L1, P8F4L2, P9F4L3, P10F4L4 |
| Fiber 3: P12F3L1-P12F3L4 | Fiber 3: P11F4L1, P12F4L2, P13F4L3, P14F4L4 |
| Fiber 4: P12F4L1-P12F4L4 | Fiber 4: P15F4L1, P16F4L2, P1F4L3, P2F4L4 |
| Input Port 13: | Output Port 29: |
| Fiber 1: P13F1L1-P13F1L4 | Fiber 1: P4F1L1, P5F1L2, P6F1L3, P7F1L4 |
| Fiber 2: P13F2L1-P13F2L4 | Fiber 2: P8F1L1, P9F1L2, P10F1L3, P11F1L4 |
| Fiber 3: P13F3L1-P13F3L4 | Fiber 3: P12F1L1, P13F1L2, P14F1L3, P15F1L4 |
| Fiber 4: P13F4L1-P13F4L4 | Fiber 4: P16F1L1, P1F1L2, P2F1L3, P3F1L4 |
| Input Port 14: | Output Port 30: |
| Fiber 1: P14F1L1-P14F1L4 | Fiber 1: P4F2L1, P5F2L2, P6F2L3, P7F2L4 |
| Fiber 2: P14F2L1-P14F2L4 | Fiber 2: P8F2L1, P9F2L2, P10F2L3, P11F2L4 |
| Fiber 3: P14F3L1-P14F3L4 | Fiber 3: P12F2L1, P13F2L2, P14F2L3, P15F2L4 |
| Fiber 4: P14F4L1-P14F4L4 | Fiber 4: P16F2L1, P1F2L2, P2F2L3, P3F2L4 |
| Input Port 15: | Output Port 31: |
| Fiber 1: P15F1L1-P15F1L4 | Fiber 1: P4F3L1, P5F3L2, P6F3L3, P7F3L4 |
| Fiber 2: P15F2L1-P15F2L4 | Fiber 2: P8F3L1, P9F3L2, P10F3L3, P11F3L4 |
| Fiber 3: P15F3L1-P15F3L4 | Fiber 3: P12F3L1, P13F3L2, P14F3L3, P15F3L4 |
| Fiber 4: P15F4L1-P15F4L4 | Fiber 4: P16F3L1, P1F3L2, P2F3L3, P3F3L4 |
| Input Port 16: | Output Port 32: |
| Fiber 1: P16F1L1-P16F1L4 | Fiber 1: P4F4L1, P5F4L2, P6F4L3, P7F4L4 |
| Fiber 2: P16F2L1-P16F2L4 | Fiber 2: P8F4L1, P9F4L2, P10F4L3, P11F4L4 |
| Fiber 3: P16F3L1-P16F3L4 | Fiber 3: P12F4L1, P13F4L2, P14F4L3, P15F4L4 |
| Fiber 4: P16F4L1-P16F4L4 | Fiber 4: P16F4L1, P1F4L2, P2F4L3, P3F4L4 |

Continuing the example, Table 2 lists an example configuration for optical permutor 40 with respect to optical communications in the reverse, downstream direction, i.e., from core switches 22 to access nodes 17. That is, Table 2 illustrates an example configuration of optical permutor 40 for producing, on the optical fibers of rack-facing output ports P1-P16, a set of 64 unique permutations for combinations of core-facing input ports P16-P32 and optical wavelengths L1-L4 carried by those input ports, where no single optical output port carries multiple optical communications having the same wavelength.

TABLE 2

| Core switch-facing Input Ports for Optical Permutor | Access node-facing Output Ports for Optical Permutor (permutation of wavelengths & input port) |
|---|---|
| Input Port 17: | Output Port 1: |
| Fiber 1: P17F1L1-P17F1L4 | Fiber 1: P17F1L1, P18F1L2, P19F1L3, P20F1L4 |
| Fiber 2: P17F2L1-P17F2L4 | Fiber 2: P21F1L1, P22F1L2, P23F1L3, P24F1L4 |
| Fiber 3: P17F3L1-P17F3L4 | Fiber 3: P25F1L1, P26F1L2, P27F1L3, P28F1L4 |
| Fiber 4: P17F4L1-P17F4L4 | Fiber 4: P29F1L1, P30F1L2, P31F1L3, P32F1L4 |
| Input Port 18: | Output Port 2: |

TABLE 2-continued

| Core switch-facing Input Ports for Optical Permutor | Access node-facing Output Ports for Optical Permutor (permutation of wavelengths & input port) |
|---|---|
| Fiber 1: P18F1L1-P18F1L4 | Fiber 1: P17F2L1, P18F2L2, P19F2L3, P20F2L4 |
| Fiber 2: P18F2L1-P18F2L4 | Fiber 2: P21F2L1, P22F2L2, P23F2L3, P24F2L4 |
| Fiber 3: P18F3L1-P18F3L4 | Fiber 3: P25F2L1, P26F2L2, P27F2L3, P28F2L4 |
| Fiber 4: P18F4L1-P18F4L4 | Fiber 4: P29F2L1, P30F2L2, P31F2L3, P32F2L4 |
| Input Port 19: | Output Port 3: |
| Fiber 1: P19F1L1-P19F1L4 | Fiber 1: P17F3L1, P18F3L2, P19F3L3, P20F3L4 |
| Fiber 2: P19F2L1-P19F2L4 | Fiber 2: P21F3L1, P22F3L2, P23F3L3, P24F3L4 |
| Fiber 3: P19F3L1-P19F3L4 | Fiber 3: P25F3L1, P26F3L2, P27F3L3, P28F3L4 |
| Fiber 4: P19F4L1-P19F4L4 | Fiber 4: P29F3L1, P30F3L2, P31F3L3, P32F3L4 |
| Input Port 20: | Output Port 4: |
| Fiber 1: P20F1L1-P20F1L4 | Fiber 1: P17F4L1, P18F4L2, P19F4L3, P20F4L4 |
| Fiber 2: P20F2L1-P20F2L4 | Fiber 2: P21F4L1, P22F4L2, P23F4L3, P24F4L4 |
| Fiber 3: P20F3L1-P20F3L4 | Fiber 3: P25F4L1, P26F4L2, P27F4L3, P28F4L4 |
| Fiber 4: P20F4L1-P20F4L4 | Fiber 4: P29F4L1, P30F4L2, P31F4L3, P32F4L4 |
| Input Port 21: | Output Port 5: |
| Fiber 1: P21F1L1-P21F1L4 | Fiber 1: P18F1L1, P19F1L2, P20F1L3, P21F1L4 |
| Fiber 2: P21F2L1-P21F2L4 | Fiber 2: P22F1L1, P23F1L2, P24F1L3, P25F1L4 |
| Fiber 3: P21F3L1-P21F3L4 | Fiber 3: P26F1L1, P27F1L2, P28F1L3, P29F1L4 |
| Fiber 4: P21F4L1-P21F4L4 | Fiber 4: P30F1L1, P31F1L2, P32F1L3, P17F1L4 |
| Input Port 22: | Output Port 6: |
| Fiber 1: P22F1L1-P22F1L4 | Fiber 1: P18F2L1, P19F2L2, P20F2L3, P21F2L4 |
| Fiber 2: P22F2L1-P22F2L4 | Fiber 2: P22F2L1, P23F2L2, P24F2L3, P25F2L4 |
| Fiber 3: P22F3L1-P22F3L4 | Fiber 3: P26F2L1, P27F2L2, P28F2L3, P29F2L4 |
| Fiber 4: P22F4L1-P22F4L4 | Fiber 4: P30F2L1, P31F2L2, P32F2L3, P17F2L4 |
| Input Port 23: | Output Port 7: |
| Fiber 1: P23F1L1-P23F1L4 | Fiber 1: P18F3L1, P19F3L2, P20F3L3, P21F3L4 |
| Fiber 2: P23F2L1-P23F2L4 | Fiber 2: P22F3L1, P23F3L2, P24F3L3, P25F3L4 |
| Fiber 3: P23F3L1-P23F3L4 | Fiber 3: P26F3L1, P27F3L2, P28F3L3, P29F3L4 |
| Fiber 4: P23F4L1-P23F4L4 | Fiber 4: P30F3L1, P31F3L2, P32F3L3, P17F3L4 |
| Input Port 24: | Output Port 8: |
| Fiber 1: P24F1L1-P24F1L4 | Fiber 1: P18F2L1, P19F2L2, P20F2L3, P21F2L4 |
| Fiber 2: P24F2L1-P24F2L4 | Fiber 2: P22F2L1, P23F2L2, P24F2L3, P25F2L4 |
| Fiber 3: P24F3L1-P24F3L4 | Fiber 3: P26F2L1, P27F2L2, P28F2L3, P29F2L4 |
| Fiber 4: P24F4L1-P24F4L4 | Fiber 4: P30F2L1, P31F2L2, P32F2L3, P17F2L4 |
| Input Port 25: | Output Port 9: |
| Fiber 1: P25F1L1-P25F1L4 | Fiber 1: P19F1L1, P20F1L2, P21F1L3, P22F1L4 |
| Fiber 2: P25F2L1-P25F2L4 | Fiber 2: P23F1L1, P24F1L2, P25F1L3, P26F1L4 |
| Fiber 3: P25F3L1-P25F3L4 | Fiber 3: P27F1L1, P28F1L2, P29F1L3, P30F1L4 |
| Fiber 4: P25F4L1-P25F4L4 | Fiber 4: P31F1L1, P32F1L2, P17F1L3, P18F1L4 |
| Input Port 26: | Output Port 10: |
| Fiber 1: P26F1L1-P26F1L4 | Fiber 1: P19F2L1, P20F2L2, P21F2L3, P22F2L4 |
| Fiber 2: P26F2L1-P26F2L4 | Fiber 2: P23F2L1, P24F2L2, P25F2L3, P26F2L4 |
| Fiber 3: P26F3L1-P26F3L4 | Fiber 3: P27F2L1, P28F2L2, P29F2L3, P30F2L4 |
| Fiber 4: P26F4L1-P26F4L4 | Fiber 4: P31F2L1, P32F2L2, P17F2L3, P18F2L4 |
| Input Port 27: | Output Port 11: |
| Fiber 1: P27F1L1-P27F1L4 | Fiber 1: P19F3L1, P20F3L2, P21F3L3, P22F3L4 |
| Fiber 2: P27F2L1-P27F2L4 | Fiber 2: P23F3L1, P24F3L2, P25F3L3, P26F3L4 |
| Fiber 3: P27F3L1-P27F3L4 | Fiber 3: P27F3L1, P28F3L2, P29F3L3, P30F3L4 |
| Fiber 4: P27F4L1-P27F4L4 | Fiber 4: P31F3L1, P32F3L2, P17F3L3, P18F3L4 |
| Input Port 28: | Output Port 12: |
| Fiber 1: P28F1L1-P28F1L4 | Fiber 1: P19F4L1, P20F4L2, P21F4L3, P22F4L4 |
| Fiber 2: P28F2L1-P28F2L4 | Fiber 2: P23F4L1, P24F4L2, P25F4L3, P26F4L4 |
| Fiber 3: P28F3L1-P28F3L4 | Fiber 3: P27F4L1, P28F4L2, P29F4L3, P30F4L4 |
| Fiber 4: P28F4L1-P28F4L4 | Fiber 4: P31F4L1, P32F4L2, P17F4L3, P18F4L4 |
| Input Port 29: | Output Port 13: |
| Fiber 1: P29F1L1-P29F1L4 | Fiber 1: P20F1L1, P21F1L2, P22F1L3, P23F1L4 |
| Fiber 2: P29F2L1-P29F2L4 | Fiber 2: P24F1L1, P25F1L2, P26F1L3, P27F1L4 |
| Fiber 3: P29F3L1-P29F3L4 | Fiber 3: P28F1L1, P29F1L2, P30F1L3, P31F1L4 |
| Fiber 4: P29F4L1-P29F4L4 | Fiber 4: P32F1L1, P17F1L2, P18F1L3, P19F1L4 |
| Input Port 30: | Output Port 14: |
| Fiber 1: P30F1L1-P30F1L4 | Fiber 1: P20F2L1, P21F2L2, P22F2L3, P23F2L4 |
| Fiber 2: P30F2L1-P30F2L4 | Fiber 2: P24F2L1, P25F2L2, P26F2L3, P27F2L4 |
| Fiber 3: P30F3L1-P30F3L4 | Fiber 3: P28F2L1, P29F2L2, P30F2L3, P31F2L4 |
| Fiber 4: P30F4L1-P30F4L4 | Fiber 4: P32F2L1, P17F2L2, P18F2L3, P19F2L4 |
| Input Port 31: | Output Port 15: |
| Fiber 1: P31F1L1-P31F1L4 | Fiber 1: P20F3L1, P21F3L2, P22F3L3, P23F3L4 |
| Fiber 2: P31F2L1-P31F2L4 | Fiber 2: P24F3L1, P25F3L2, P26F3L3, P27F3L4 |
| Fiber 3: P31F3L1-P31F3L4 | Fiber 3: P28F3L1, P29F3L2, P30F3L3, P31F3L4 |
| Fiber 4: P31F4L1-P31F4L4 | Fiber 4: P32F3L1, P17F3L2, P18F3L3, P19F3L4 |
| Input Port 32: | Output Port 16: |
| Fiber 1: P32F1L1-P32F1L4 | Fiber 1: P20F4L1, P21F4L2, P22F4L3, P23F4L4 |
| Fiber 2: P32F2L1-P32F2L4 | Fiber 2: P24F4L1, P25F4L2, P26F4L3, P27F4L4 |
| Fiber 3: P32F3L1-P32F3L4 | Fiber 3: P28F4L1, P29F4L2, P30F4L3, P31F4L4 |
| Fiber 4: P32F4L1-P32F4L4 | Fiber 4: P32F4L1, P17F4L2, P18F4L3, P19F4L4 |

Table 3 lists a second example configuration for optical permutor 40 for optical communications in the core-facing direction. As with Table 1 above, Table 3 illustrates an example configuration of optical permutor 40 for producing, on the optical fibers of core-facing output ports P17-P32, a set of 64 unique permutations for combinations of optical input ports P1-P16 and optical wavelengths L1-L4 carried by those input ports, where no single optical output port carries multiple optical communications having the same wavelength. Similar to Table 1 above, the first column of Table 3 lists the wavelengths L1-L4 carried by the four fibers F1-F4 of each input optical interfaces for ports P0-P16 while the right column lists another example of unique and non-interfering permutation of input port fiber/wavelength combination output on each optical output interface of ports P17-P32.

TABLE 3

| Rack-facing Input ports for Optical Permutor | Core-switch facing Output Ports for Optical Permutor (permutation of wavelengths & input port) |
|---|---|
| Input Port 1: | Output Port 17: |
| Fiber 1: P1F1L1-P1F1L4 | Fiber 1: P1F1L1, P2F1L2, P3F1L3, P4F1L4 |
| Fiber 2: P1F2L1-P1F2L4 | Fiber 2: P5F1L1, P6F1L2, P7F1L3, P8F1L4 |
| Fiber 3: P1F3L1-P1F3L4 | Fiber 3: P9F1L1, P10F1L2, P11F1L3, P12F1L4 |
| Fiber 4: P1F4L1-P1F4L4 | Fiber 4: P13F1L1, P14F1L2, P15F1L3, P16F1L4 |
| Input Port 2: | Output Port 18: |
| Fiber 1: P2F1L1-P2F1L4 | Fiber 1: P2F1L1, P3F1L2, P4F1L3, P1F1L4 |
| Fiber 2: P2F2L1-P2F2L4 | Fiber 2: P6F1L1, P7F1L2, P8F1L3, P5F1L4 |
| Fiber 3: P2F3L1-P2F3L4 | Fiber 3: P10F1L1, P11F1L2, P12F1L3, P9F1L4 |
| Fiber 4: P2F4L1-P2F4L4 | Fiber 4: P14F1L1, P15F1L2, P16F1L3, P13F1L4 |
| Input Port 3: | Output Port 19: |
| Fiber 1: P3F1L1-P3F1L4 | Fiber 1: P3F1L1, P4F1L2, P1F1L3, P2F1L4 |
| Fiber 2: P3F2L1-P3F2L4 | Fiber 2: P7F1L1, P8F1L2, P5F1L3, P6F1L4 |
| Fiber 3: P3F3L1-P3F3L4 | Fiber 3: P11F1L1, P12F1L2, P9F1L3, P10F1L4 |
| Fiber 4: P3F4L1-P3F4L4 | Fiber 4: P15F1L1, P16F1L2, P13F1L3, P14F1L4 |
| Input Port 4: | Output Port 20: |
| Fiber 1: P4F1L1-P4F1L4 | Fiber 1: P4F1L1, P1F1L2, P2F1L3, P3F1L4 |
| Fiber 2: P4F2L1-P4F2L4 | Fiber 2: P8F1L1, P5F1L2, P6F1L3, P7F1L4 |
| Fiber 3: P4F3L1-P4F3L4 | Fiber 3: P12F1L1, P9F1L2, P10F1L3, P11F1L4 |
| Fiber 4: P4F4L1-P4F4L4 | Fiber 4: P16F1L1, P13F1L2, P14F1L3, P15F1L4 |
| Input Port 5: | Output Port 21: |
| Fiber 1: P5F1L1-P5F1L4 | Fiber 1: P1F2L1, P2F2L2, P3F2L3, P4F2L4 |
| Fiber 2: P5F2L1-P5F2L4 | Fiber 2: P5F2L1, P6F2L2, P7F2L3, P8F2L4 |
| Fiber 3: P5F3L1-P5F3L4 | Fiber 3: P9F2L1, P10F2L2, P11F2L3, P12F2L4 |
| Fiber 4: P5F4L1-P5F4L4 | Fiber 4: P13F2L1, P14F2L2, P15F2L3, P6F2L4 |
| Input Port 6: | Output Port 22: |
| Fiber 1: P6F1L1-P6F1L4 | Fiber 1: P2F2L1, P3F2L2, P4F2L3, P1F2L4 |
| Fiber 2: P6F2L1-P6F2L4 | Fiber 2: P6F2L1, P7F2L2, P8F2L3, P5F2L4 |
| Fiber 3: P6F3L1-P6F3L4 | Fiber 3: P10F2L1, P11F2L2, P12F2L3, P9F2L4 |
| Fiber 4: P6F4L1-P6F4L4 | Fiber 4: P14F2L1, P15F2L2, P16F2L3, P13F2L4 |
| Input Port 7: | Output Port 23: |
| Fiber 1: P7F1L1-P7F1L4 | Fiber 1: P3F2L1, P4F2L2, P1F2L3, P2F2L4 |
| Fiber 2: P7F2L1-P7F2L4 | Fiber 2: P7F2L1, P8F2L2, P5F2L3, P6F2L4 |
| Fiber 3: P7F3L1-P7F3L4 | Fiber 3: P11F2L1, P12F2L2, P9F2L3, P10F2L4 |
| Fiber 4: P7F4L1-P7F4L4 | Fiber 4: P15F2L1, P16F2L2, P13F2L3, P14F2L4 |
| Input Port 8: | Output Port 24: |
| Fiber 1: P8F1L1-P8F1L4 | Fiber 1: P4F2L1, P1F2L2, P2F2L3, P3F2L4 |
| Fiber 2: P8F2L1-P8F2L4 | Fiber 2: P8F2L1, P5F2L2, P6F2L3, P7F2L4 |
| Fiber 3: P8F3L1-P8F3L4 | Fiber 3: P12F2L1, P9F2L2, P10F2L3, P11F2L4 |
| Fiber 4: P8F4L1-P8F4L4 | Fiber 4: P16F2L1, P13F2L2, P14F2L3, P15F2L4 |
| Input Port 9: | Output Port 25: |
| Fiber 1: P9F1L1-P9F1L4 | Fiber 1: P1F3L1, P2F3L2, P3F3L3, P4F3L4 |
| Fiber 2: P9F2L1-P9F2L4 | Fiber 2: P5F3L1, P6F3L2, P7F3L3, P8F3L4 |
| Fiber 3: P9F3L1-P9F3L4 | Fiber 3: P9F3L1, P10F3L2, P11F3L3, P12F3L4 |
| Fiber 4: P9F4L1-P9F4L4 | Fiber 4: P13F3L1, P14F3L2, P15F3L3, P16F3L4 |
| Input Port 10: | Output Port 26: |
| Fiber 1: P10F1L1-P10F1L4 | Fiber 1: P2F3L1, P3F3L2, P4F3L3, P1F3L4 |
| Fiber 2: P10F2L1-P10F2L4 | Fiber 2: P6F3L1, P7F3L2, P8F3L3, P5F3L4 |
| Fiber 3: P10F3L1-P10F3L4 | Fiber 3: P10F3L1, P11F3L2, P12F3L3, P9F3L4 |
| Fiber 4: P10F4L1-P10F4L4 | Fiber 4: P14F3L1, P15F3L2, P16F3L3, P13F3L4 |
| Input Port 11: | Output Port 27: |
| Fiber 1: P11F1L1-P11F1L4 | Fiber 1: P3F3L1, P4F3L2, P1F3L3, P2F3L4 |
| Fiber 2: P11F2L1-P11F2L4 | Fiber 2: P7F3L1, P8F3L2, P5F3L3, P6F3L4 |
| Fiber 3: P11F3L1-P11F3L4 | Fiber 3: P11F3L1, P12F3L2, P9F3L3, P10F3L4 |
| Fiber 4: P11F4L1-P11F4L4 | Fiber 4: P15F3L1, P16F3L2, P13F3L3, P14F3L4 |
| Input Port 12: | Output Port 28: |
| Fiber 1: P12F1L1-P12F1L4 | Fiber 1: P4F3L1, P1F3L2, P2F3L3, P3F3L4 |
| Fiber 2: P12F2L1-P12F2L4 | Fiber 2: P8F3L1, P5F3L2, P6F3L3, P7F3L4 |
| Fiber 3: P12F3L1-P12F3L4 | Fiber 3: P12F3L1, P9F3L2, P10F3L3, P11F3L4 |
| Fiber 4: P12F4L1-P12F4L4 | Fiber 4: P16F3L1, P13F3L2, P14F3L3, P15F3L4 |
| Input Port 13: | Output Port 29: |
| Fiber 1: P13F1L1-P13F1L4 | Fiber 1: P1F4L1, P2F4L2, P3F4L3, P4F4L4 |
| Fiber 2: P13F2L1-P13F2L4 | Fiber 2: P5F4L1, P6F4L2, P7F4L3, P8F4L4 |
| Fiber 3: P13F3L1-P13F3L4 | Fiber 3: P9F4L1, P10F4L2, P11F4L3, P12F4L4 |
| Fiber 4: P13F4L1-P13F4L4 | Fiber 4: P13F4L1, P14F4L2, P15F4L3, P16F4L4 |
| Input Port 14: | Output Port 30: |

TABLE 3-continued

| Rack-facing Input ports for Optical Permutor | Core-switch facing Output Ports for Optical Permutor (permutation of wavelengths & input port) |
|---|---|
| Fiber 1: P14F1L1-P14F1L4 | Fiber 1: P2F4L1, P3F4L2, P4F4L3, P1F4L4 |
| Fiber 2: P14F2L1-P14F2L4 | Fiber 2: P6F4L1, P7F4L2, P8F4L3, P5F4L4 |
| Fiber 3: P14F3L1-P14F3L4 | Fiber 3: P10F4L1, P11F4L2, P12F4L3, P9F4L4 |
| Fiber 4: P14F4L1-P14F4L4 | Fiber 4: P14F4L1, P15F4L2, P16F4L3, P13F4L4 |
| Input Port 15: | Output Port 31: |
| Fiber 1: P15F1L1-P15F1L4 | Fiber 1: P3F4L1, P4F4L2, P1F4L3, P2F4L4 |
| Fiber 2: P15F2L1-P15F2L4 | Fiber 2: P7F4L1, P8F4L2, P5F4L3, P6F4L4 |
| Fiber 3: P15F3L1-P15F3L4 | Fiber 3: P11F4L1, P12F4L2, P9F4L3, P10F4L4 |
| Fiber 4: P15F4L1-P15F4L4 | Fiber 4: P15F4L1, P16F4L2, P13F4L3, P14F4L4 |
| Input Port 16: | Output Port 32: |
| Fiber 1: P16F1L1-P16F1L4 | Fiber 1: P4F4L1, P1F4L2, P2F4L3, P3F4L4 |
| Fiber 2: P16F2L1-P16F2L4 | Fiber 2: P8F4L1, P5F4L2, P6F4L3, P7F4L4 |
| Fiber 3: P16F3L1-P16F3L4 | Fiber 3: P12F4L1, P9F4L2, P10F4L3, P11F4L4 |
| Fiber 4: P16F4L1-P16F4L4 | Fiber 4: P16F4L1, P13F4L2, P14F4L3, P15F4L4 |

Continuing the example, Table 4 lists another example configuration for optical permutor 40 with respect to optical communications in the reverse, downstream direction, i.e., from core switches 22 to access nodes 17. Like Table 2 above, Table 4 illustrates another example configuration of optical permutor 40 for producing, on the optical fibers of rack-facing output ports P1-P16, a set of 64 unique permutations for combinations of core-facing input ports P16-P32 and optical wavelengths L1-L4 carried by those input ports, where no single optical output port carries multiple optical communications having the same wavelength.

TABLE 4

| Core switch-facing Input Ports for Optical Permutor | Access node-facing Output Ports for Optical Permutor (permutation of wavelengths & input port) |
|---|---|
| Input Port 17: | Output Port 1: |
| Fiber 1: P17F1L1-P17F1L4 | Fiber 1: P17F1L1, P18F1L2, P19F1L3, P20F1L4 |
| Fiber 2: P17F2L1-P17F2L4 | Fiber 2: P21F1L1, P22F1L2, P23F1L3, P24F1L4 |
| Fiber 3: P17F3L1-P17F3L4 | Fiber 3: P25F1L1, P26F1L2, P27F1L3, P28F1L4 |
| Fiber 4: P17F4L1-P17F4L4 | Fiber 4: P29F1L1, P30F1L2, P31F1L3, P32F1L4 |
| Input Port 18: | Output Port 2: |
| Fiber 1: P18F1L1-P18F1L4 | Fiber 1: P18F1L1, P19F1L2, P20F1L3, P17F1L4 |
| Fiber 2: P18F2L1-P18F2L4 | Fiber 2: P22F1L1, P23F1L2, P24F1L3, P21F1L4 |
| Fiber 3: P18F3L1-P18F3L4 | Fiber 3: P26F1L1, P27F1L2, P28F1L3, P25F1L4 |
| Fiber 4: P18F4L1-P18F4L4 | Fiber 4: P30F1L1, P31F1L2, P32F1L3, P29F1L4 |
| Input Port 19: | Output Port 3: |
| Fiber 1: P19F1L1-P19F1L4 | Fiber 1: P19F1L1, P20F1L2, P17F1L3, P18F1L4 |
| Fiber 2: P19F2L1-P19F2L4 | Fiber 2: P23F1L1, P24F1L2, P21F1L3, P22F1L4 |
| Fiber 3: P19F3L1-P19F3L4 | Fiber 3: P27F1L1, P28F1L2, P25F1L3, P26F1L4 |
| Fiber 4: P19F4L1-P19F4L4 | Fiber 4: P31F1L1, P32F1L2, P29F1L3, P30F1L4 |
| Input Port 20: | Output Port 4: |
| Fiber 1: P20F1L1-P20F1L4 | Fiber 1: P20F1L1, P17F1L2, P18F1L3, P19F1L4 |
| Fiber 2: P20F2L1-P20F2L4 | Fiber 2: P24F1L1, P21F1L2, P22F1L3, P23F1L4 |
| Fiber 3: P20F3L1-P20F3L4 | Fiber 3: P28F1L1, P25F1L2, P26F1L3, P27F1L4 |
| Fiber 4: P20F4L1-P20F4L4 | Fiber 4: P32F1L1, P29F1L2, P30F1L3, P31F1L4 |
| Input Port 21: | Output Port 5: |
| Fiber 1: P21F1L1-P21F1L4 | Fiber 1: P17F2L1, P18F2L2, P19F2L3, P20F2L4 |
| Fiber 2: P21F2L1-P21F2L4 | Fiber 2: P21F2L1, P22F2L2, P23F2L3, P24F2L4 |
| Fiber 3: P21F3L1-P21F3L4 | Fiber 3: P25F2L1, P26F2L2, P27F2L3, P28F2L4 |
| Fiber 4: P21F4L1-P21F4L4 | Fiber 4: P29F2L1, P30F2L2, P31F2L3, P32F2L4 |
| Input Port 22: | Output Port 6: |
| Fiber 1: P22F1L1-P22F1L4 | Fiber 1: P18F2L1, P19F2L2, P20F2L3, P17F2L4 |
| Fiber 2: P22F2L1-P22F2L4 | Fiber 2: P22F2L1, P23F2L2, P24F2L3, P21F2L4 |
| Fiber 3: P22F3L1-P22F3L4 | Fiber 3: P26F2L1, P27F2L2, P28F2L3, P25F2L4 |
| Fiber 4: P22F4L1-P22F4L4 | Fiber 4: P30F2L1, P31F2L2, P32F2L3, P29F2L4 |
| Input Port 23: | Output Port 7: |
| Fiber 1: P23F1L1-P23F1L4 | Fiber 1: P19F2L1, P20F2L2, P17F2L3, P18F2L4 |
| Fiber 2: P23F2L1-P23F2L4 | Fiber 2: P23F2L1, P24F2L2, P21F2L3, P22F2L4 |
| Fiber 3: P23F3L1-P23F3L4 | Fiber 3: P27F2L1, P28F2L2, P25F2L3, P26F2L4 |
| Fiber 4: P23F4L1-P23F4L4 | Fiber 4: P31F2L1, P32F2L2, P29F2L3, P30F2L4 |
| Input Port 24: | Output Port 8: |
| Fiber 1: P24F1L1-P24F1L4 | Fiber 1: P20F2L1, P17F2L2, P18F2L3, P19F2L4 |
| Fiber 2: P24F2L1-P24F2L4 | Fiber 2: P24F2L1, P21F2L2, P22F2L3, P23F2L4 |
| Fiber 3: P24F3L1-P24F3L4 | Fiber 3: P28F2L1, P25F2L2, P26F2L3, P27F2L4 |
| Fiber 4: P24F4L1-P24F4L4 | Fiber 4: P32F2L1, P29F2L2, P30F2L3, P31F2L4 |
| Input Port 25: | Output Port 9: |
| Fiber 1: P25F1L1-P25F1L4 | Fiber 1: P17F3L1, P18F3L2, P19F3L3, P20F3L4 |
| Fiber 2: P25F2L1-P25F2L4 | Fiber 2: P21F3L1, P22F3L2, P23F3L3, P24F3L4 |
| Fiber 3: P25F3L1-P25F3L4 | Fiber 3: P25F3L1, P26F3L2, P27F3L3, P28F3L4 |
| Fiber 4: P25F4L1-P25F4L4 | Fiber 4: P29F3L1, P30F3L2, P31F3L3, P32F3L4 |

TABLE 4-continued

| Core switch-facing Input Ports for Optical Permutor | Access node-facing Output Ports for Optical Permutor (permutation of wavelengths & input port) |
|---|---|
| Input Port 26: | Output Port 10: |
| Fiber 1: P26F1L1-P26F1L4 | Fiber 1: P18F3L1, P19F3L2, P20F3L3, P17F3L4 |
| Fiber 2: P26F2L1-P26F2L4 | Fiber 2: P22F3L1, P23F3L2, P24F3L3, P21F3L4 |
| Fiber 3: P26F3L1-P26F3L4 | Fiber 3: P26F3L1, P27F3L2, P28F3L3, P25F3L4 |
| Fiber 4: P26F4L1-P26F4L4 | Fiber 4: P30F3L1, P31F3L2, P32F3L3, P29F3L4 |
| Input Port 27: | Output Port 11: |
| Fiber 1: P27F1L1-P27F1L4 | Fiber 1: P19F3L1, P20F3L2, P17F3L3, P18F3L4 |
| Fiber 2: P27F2L1-P27F2L4 | Fiber 2: P23F3L1, P24F3L2, P21F3L3, P22F3L4 |
| Fiber 3: P27F3L1-P27F3L4 | Fiber 3: P27F3L1, P28F3L2, P25F3L3, P26F3L4 |
| Fiber 4: P27F4L1-P27F4L4 | Fiber 4: P31F3L1, P32F3L2, P29F3L3, P30F3L4 |
| Input Port 28: | Output Port 12: |
| Fiber 1: P28F1L1-P28F1L4 | Fiber 1: P20F3L1, P17F3L2, P18F3L3, P18F3L4 |
| Fiber 2: P28F2L1-P28F2L4 | Fiber 2: P24F3L1, P21F3L2, P22F3L3, P23F3L4 |
| Fiber 3: P28F3L1-P28F3L4 | Fiber 3: P28F3L1, P25F3L2, P26F3L3, P27F3L4 |
| Fiber 4: P28F4L1-P28F4L4 | Fiber 4: P32F3L1, P29F3L2, P30F3L3, P31F3L4 |
| Input Port 29: | Output Port 13: |
| Fiber 1: P29F1L1-P29F1L4 | Fiber 1: P17F4L1, P18F4L2, P19F4L3, P20F4L4 |
| Fiber 2: P29F2L1-P29F2L4 | Fiber 2: P21F4L1, P22F4L2, P23F4L3, P24F4L4 |
| Fiber 3: P29F3L1-P29F3L4 | Fiber 3: P25F4L1, P26F4L2, P27F4L3, P28F4L4 |
| Fiber 4: P29F4L1-P29F4L4 | Fiber 4: P29F4L1, P30F4L2, P31F4L3, P32F4L4 |
| Input Port 30: | Output Port 14: |
| Fiber 1: P30F1L1-P30F1L4 | Fiber 1: P18F4L1, P19F4L2, P20F4L3, P17F4L4 |
| Fiber 2: P30F2L1-P30F2L4 | Fiber 2: P22F4L1, P23F4L2, P24F4L3, P21F4L4 |
| Fiber 3: P30F3L1-P30F3L4 | Fiber 3: P26F4L1, P27F4L2, P28F4L3, P25F4L4 |
| Fiber 4: P30F4L1-P30F4L4 | Fiber 4: P30F4L1, P31F4L2, P32F4L3, P29F4L4 |
| Input Port 31: | Output Port 15: |
| Fiber 1: P31F1L1-P31F1L4 | Fiber 1: P19F4L1, P20F4L2, P17F4L3, P18F4L4 |
| Fiber 2: P31F2L1-P31F2L4 | Fiber 2: P23F4L1, P24F4L2, P21F4L3, P22F4L4 |
| Fiber 3: P31F3L1-P31F3L4 | Fiber 3: P27F4L1, P28F4L2, P25F4L3, P26F4L4 |
| Fiber 4: P31F4L1-P31F4L4 | Fiber 4: P31F4L1, P32F4L2, P29F4L3, P30F4L4 |
| Input Port 32: | Output Port 16: |
| Fiber 1: P32F1L1-P32F1L4 | Fiber 1: P20F4L1, P17F4L2, P18F4L3, P19F4L4 |
| Fiber 2: P32F2L1-P32F2L4 | Fiber 2: P24F4L1, P21F4L2, P22F4L3, P23F4L4 |
| Fiber 3: P32F3L1-P32F3L4 | Fiber 3: P28F4L1, P25F4L2, P26F4L3, P27F4L4 |
| Fiber 4: P32F4L1-P32F4L4 | Fiber 4: P32F4L1, P29F4L2, P30F4L3, P31F4L4 |

Figure 3A:
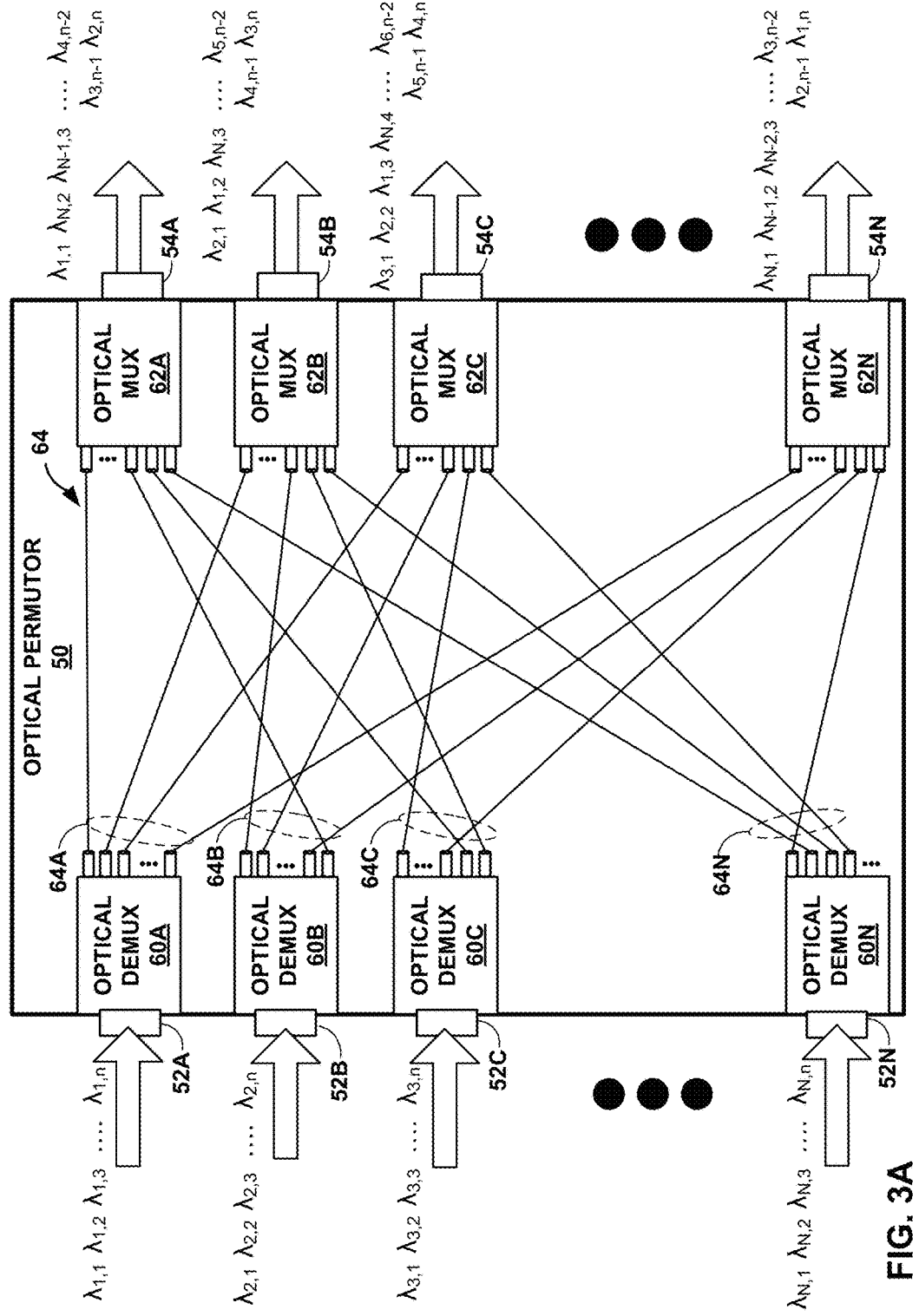
FIG. 3A is a block diagram showing another example implementation of an optical permutor in accordance with the techniques described herein.

FIG. 3A is a block diagram illustrating an example optical permutor 50, which may be any of optical permutors 32 of FIG. 1. In this example, optical permutor 50 includes a plurality of input ports 52A-52N (herein, "input ports 52") to receive respective optical signals, each of the optical signals carrying communications at a set of n wavelengths. Each communication is designated as $\lambda_{p,w}$, where the subscript p represents the port and the subscript w represents with wavelength. Thus, using this nomenclature, optical input 52A receives a light beam carrying communications at n different wavelengths designated $\lambda_{1,1}$, $\lambda_{1,2}$, ..., $\lambda_{1,n}$. Similarly, optical input 52B receives a light beam carrying communications at n different wavelengths designated $\lambda_{2,1}$, $\lambda_{2,2}$, ... $\lambda_{2,n}$.

Optical permutor 50 includes a respective one of optical demultiplexers 60A-60N (herein, "optical demuxes 60") for each optical input interface 52, where the optical demultiplexer is configured to demultiplex the optical communications for a given optical input onto internal optical pathways 64 based on the bandwidth of the optical communications. For example, optical demux 60A separates the optical communications received on optical input interface 52A onto a set of internal optical pathways 64A based on wavelengths $\lambda_{1,1}$, $\lambda_{1,2}$, ... $\lambda_{1,n}$. Optical demux 60B separates the optical communications received on optical input interface 52B onto a set of internal optical pathways 64B based on wavelengths $\lambda_{2,1}$, $\lambda_{2,2}$, ..., $\lambda_{2,n}$. Each optical demux 60 operates in a similar fashion to separate the optical communications received from the receptive input optical interface 52 so as to direct the optical communications through internal optical pathways 64 toward optical output ports 54A-54N (herein, "optical output ports 54").

Optical permutor 50 includes a respective one of optical multiplexers 62A-62N (herein, "optical muxes 62") for each optical output port 54, where the optical multiplexer receives as input optical signals from optical pathways 64 that lead to each optical demux 64. In other words, optical pathways 64 internal to optical permutor 50 provide a full-mesh of $N^2$ optical interconnects between optical demuxes 60 and optical muxes 62. Each optical multiplexer 62 receives N optical pathways as input and combines the optical signals carried by the N optical pathways into a single optical signal for output onto a respective optical fiber.

Moreover, optical demuxes 60 are each configured such that optical communications received from input interface ports 52 are "permuted" across optical output ports 54 based on wavelength so as to provide full-mesh connectivity between the ports and in a way that ensures optical interference is avoided. That is, each optical demux 60 is configured to ensure that each optical output port 54 receives a different one of the possible unique permutations of the combinations of optical input ports 52 and the optical frequencies carried by those ports and where no single optical output port 54 carries communications having the same wavelength.

For example, optical demux 60A may be configured to direct the optical signal having wavelength $\lambda_{1,1}$ to optical mux 62A, wavelength $\lambda_{1,2}$ to optical mux 62B, wavelength $\lambda_{1,3}$ to optical mux 62C, ... and wavelength $\lambda_{1,n}$ to optical mux 62N. Optical demux 60B is configured to deliver a different (second) permutation of optical signals by outputting wavelength $\lambda_{2,n}$ to optical mux 62A, wavelength $\lambda_{2,1}$ to optical mux 62B, wavelength $\lambda_{2,2}$ to optical mux 62C, . . . and wavelength $\lambda_{2,n-1}$ to optical mux 62N. Optical demux 60C is configured to deliver a different (third) permutation of optical signals by outputting wavelength $\lambda_{3,n-1}$ to optical mux 62A, wavelength $\lambda_{3,n-2}$ to optical mux 62B, wavelength $\lambda_{3,n-3}$ to optical mux 62C, . . . and wavelength $\lambda_{3,n-2}$ to optical mux 62N. This example configuration pattern continues through optical demux 60N, which is configured to deliver a different ($N^{th}$) permutation of optical signals by outputting wavelength $\lambda_{N,2}$ to optical mux 62A, wavelength $\lambda_{N,3}$ to optical mux 62B, wavelength $\lambda_{N,4}$ to optical mux 62C, . . . and wavelength $\lambda_{N,1}$ to optical mux 62N.

In the example implementation, optical pathways 64 are arranged such that the different permutations of input interface/wavelengths are delivered to optical muxes 62. In other words, each optical demux 60 may be configured to operate in a similar manner, such as $\lambda_1$ being provided to a first port of the demux, $\lambda_2$ being provided to a second port of the demux . . . , and $\lambda_n$ being provided to an $N^{th}$ port of the demux. Optical pathways 64 are arranged to optically deliver a specific permutation of wavelengths to each optical mux 62 such that any communications from any one of optical demuxes 60 can reach any optical mux 62 and, moreover, each permutation of wavelengths is selected to avoid any interference between the signals, i.e., be non-overlapping.

For example, as shown in FIG. 3A, optical paths 64A provide optical interconnects from a first port of optical demux 60A carrying $\lambda_{1,1}$ to optical mux 62A, from a second port of optical demux 60A carrying 42 to optical mux 62B, from a third port of optical demux 60A carrying $\lambda_{1,3}$ to optical mux 62C, . . . and from an $N^{th}$ port of optical demux 60A carrying to optical mux 62N. Rather than provide an interconnect in the same way as optical paths 64A, optical paths 64B are arranged to provide optical interconnects from a first port of optical demux 60B carrying $\lambda_{2,1}$ to optical mux 62B, from a second port of optical demux 60B carrying $\lambda_{2,2}$ to optical mux 62C, . . . from an N-$1^{st}$ port of optical demux 60B carrying $\lambda_{2,n-1}$ to optical mux 62N, and from an $N^{th}$ port of optical demux 60B carrying $\lambda_{2,n}$ to optical mux 62A. Optical paths 64C are arranged in yet another manner so as to provide optical interconnects from a first port of optical demux 60C carrying $\lambda_{3,1}$ to optical mux 62C, . . . from an N-$2^{nd}$ port of optical demux 60C carrying $\lambda_{3,n-2}$ to optical mux 62N, from an N-$1^{st}$ port of optical demux 60C carrying $\lambda_{3,n-1}$ to optical mux 62A, and from an $N^{th}$ port of optical demux 60C carrying $\lambda_{3,n}$ to optical mux 62B. This interconnect pattern continues, in this example, such that optical paths 64N are arranged to provide optical interconnects from a first port of optical demux 60N carrying $\lambda_{N,1}$ to optical mux 62N, from a second port of optical demux 60N carrying $\lambda_{N,2}$ to optical mux 62A, from a third port of optical demux 60N carrying $\lambda_{N,3}$ to optical mux 62B, and from a fourth port of optical demux 60N carrying $\lambda_{N,4}$ to optical mux 62C, . . . .

In this way, a different permutation of input optical interface/wavelength combination is provided to each optical mux 62 and, moreover, each one of the permutations provided to the respective optical mux is guaranteed to include optical communications having non-overlapping wavelengths.

Optical permutor 50 illustrates one example implementation of the techniques described herein. In other example implementations, each optical interface 42 need not receive all N wavelengths from a single optical fiber. For example, different subsets of the N wavelengths can be provided by multiple fibers, which would then be combined (e.g., by a multiplexer) and subsequently permuted as described herein. As one example, optical permutor 50 may have 2N optical inputs 52 so as to receive 2N optical fibers, where a first subset of N optical fibers carries wavelengths $\lambda_1 \ldots \lambda_{n/2}$ and a second subset of N optical fibers carries wavelengths $\lambda_{n/2+1} \ldots \lambda_n$. Light from pairs of the optical inputs from the first and second set may be combined to form optical inputs carrying N wavelengths, which may then be permuted as shown in the example of FIG. 3A.

In the example implementation, optical permutor 50, including optical input ports 52, optical demuxes 60, optical pathways 64, optical muxes 62 and optical output ports 54 may be implemented as one or more application specific integrated circuit (ASIC), such as a photonic integrated circuit or an integrated optical circuit. In other words, the optical functions described herein may be integrated on a single chip, thereby providing an integrated optical permutor that may be incorporated into electronic cards, devices and systems.

Figure 3B:
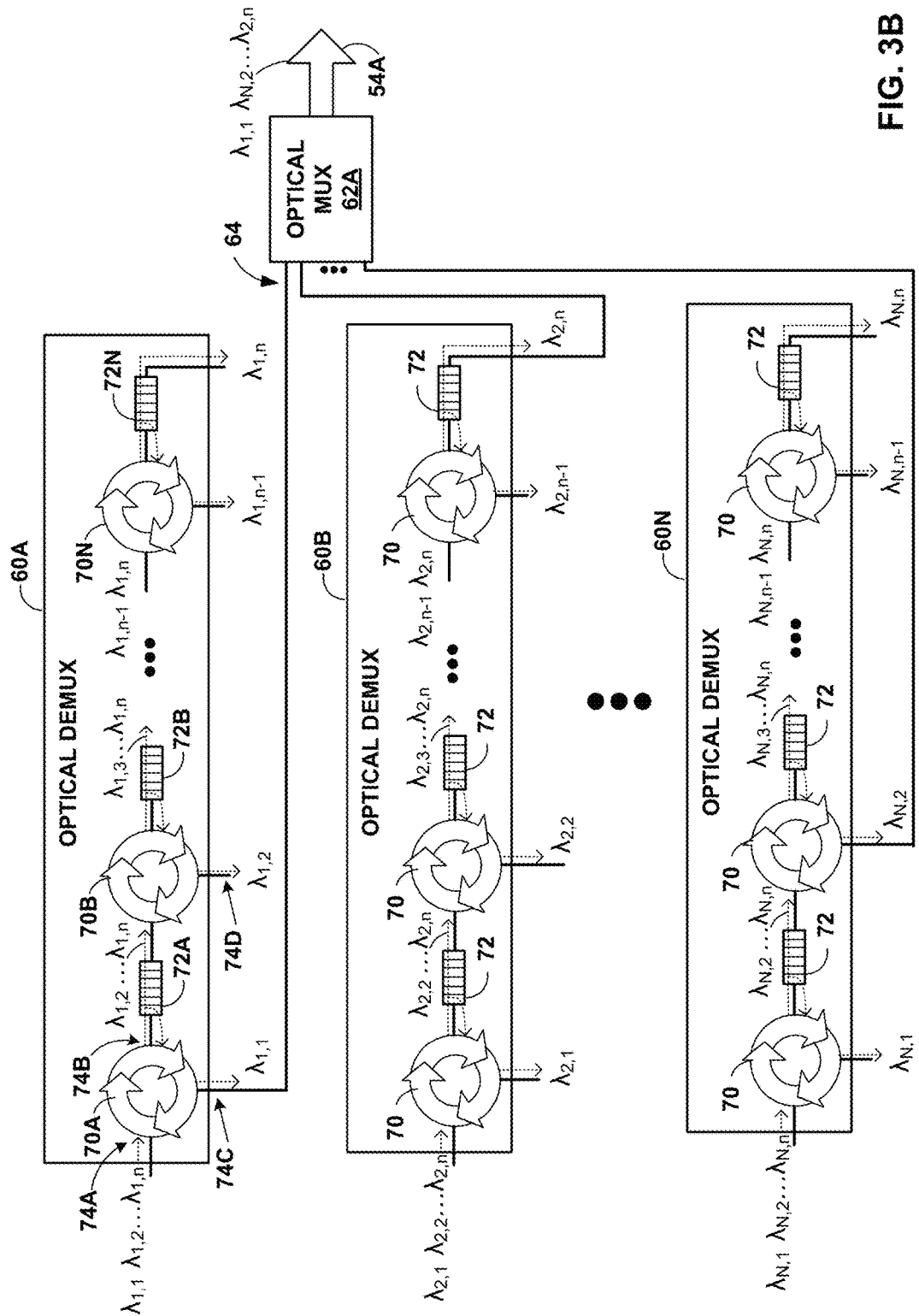
FIG. 3B is a block diagram showing an example implementation of optical demultiplexors for the optical permutor of FIG. 3A.

FIG. 3B is a block diagram another example implementation of optical permutor 50. In the example implementation, optical demuxes 60 are configured differently so as to direct different respective permutations of input interface/wavelengths to optical pathways 64 for transport to optical muxes 62.

In the example implementation of FIG. 3B, each optical demux 60 includes a series of optical circulators 70 having optical grating elements 72 disposed after each of the optical circulators. Optical grating elements may be, for example Fiber Bragg Grating (FBG) elements or Arrayed Waveguide Grating (AWG). Each pair of optical circulators 70 and Optical grating elements 72 is configured to selectively direct a particular wavelength out the corresponding output port of the optical demux 60. Specifically, each optical circulator 70 operates to direct all incoming light received on any of its optical interfaces out a next optical interface in a clockwise direction around the circulator. For example, optical circulator 70A receives light on optical interface 74A and directs all wavelengths around the optical circulator and out optical interface 74B. Each Optical grating element 72 is configured to reflect a particular wavelength which re-enters the upstream circulator from which the light was received. For example, Optical grating element 72A receives wavelengths $\lambda_{1,1}, \lambda_{1,2}, \ldots \lambda_{1,n}$ from upstream circulator 70A and is configured to reflect $\lambda_{1,1}$ and pass all other wavelengths $\lambda_{1,2}, \ldots \lambda_{1,n}$. Light having $\lambda_{1,1}$ reenters circulator 70A where the light is passed to the next optical interface 74C to optical pathways 64. Light having wavelengths $\lambda_{1,2}, \ldots \lambda_{1,n}$ continues downstream where optical circulator 70B and Optical grating element 72B are configured to selectively direct light having wavelength $\lambda_{1,2}$ out optical interface 74D to optical pathways 64. In this way, each Optical grating element 72 is configured to selectively redirect the correct wavelength out of the appropriate optical ports of optical demuxes 60 such that each of the demuxes outputs a different permutation of optical wavelengths that are transported to optical muxes 62.

In other examples, optical permutors 32, 40, 50 may make use of star couplers and waveguide grating routers described in Kaminow, "Optical Integrated Circuits: A Personal Perspective," Journal of Lightwave Technology, vol. 26, no. 9, May 1, 2008, the entire contents of which are incorporated herein by reference.

Figure 4:
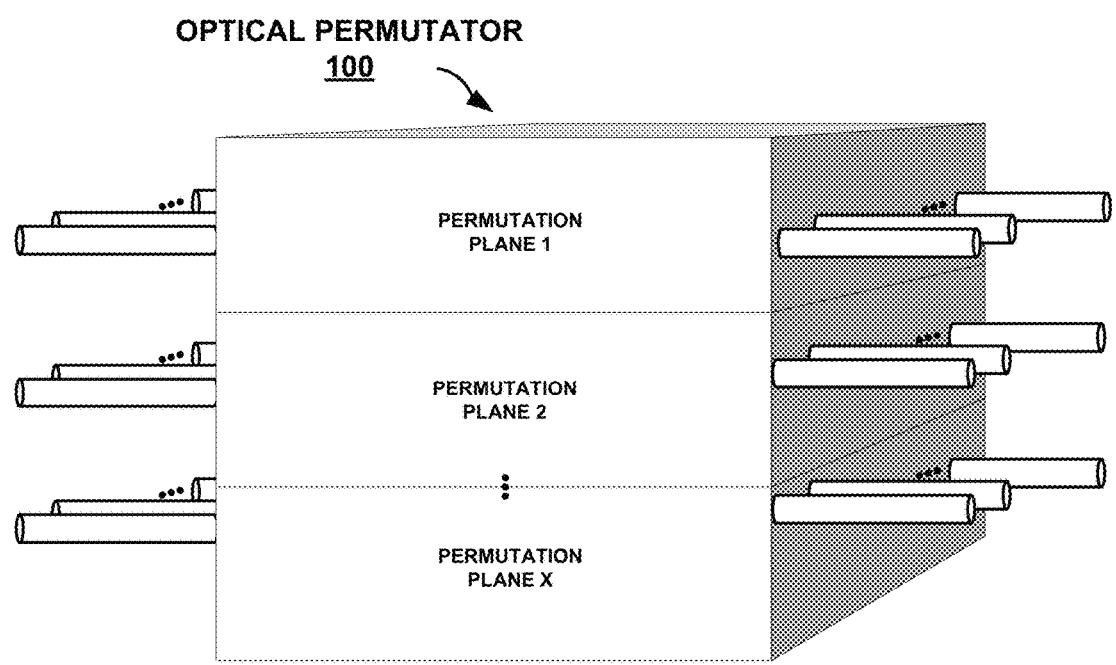
FIG. 4 is a block diagram illustrating an optical permutor having a plurality of logical planes, each of the planes arranged to operate as an optical permutor as described herein.

FIG. 4 is a block diagram illustrating an optical permutor 100 having a plurality of logical permutation planes 1-X. Each permutation plane may be configured substantially as described above so as to permute wavelength/input port combinations to output ports in a manner that guarantees no interference. Each permutation plane 1-X may, for example, be implemented as optical permutor 40 from FIGS. 2A-2B or optical permutor 50 from FIGS. 3A-3B, and the multiple permutation planes may be packaged on a single chip. In this example implementation, optical permutor 100 may readily be scaled in a single device to support high numbers of optical inputs and outputs.

Figure 5:
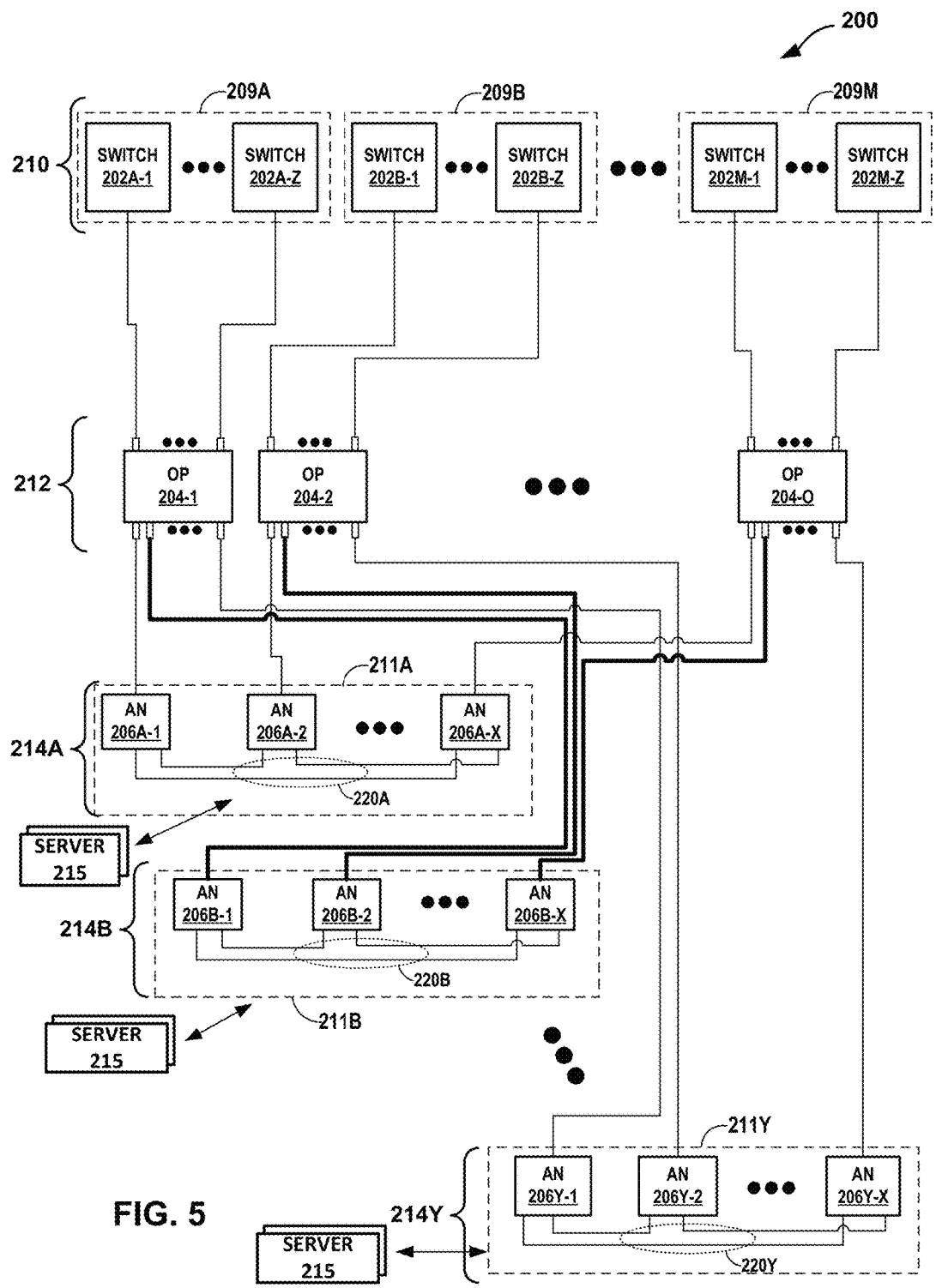
FIG. 5 is a block diagram illustrating a more detailed example implementation of a network in which a set of optical permutation devices is utilized to interconnect endpoints.

FIG. 5 is a block diagram illustrating a more detailed example implementation of a network 200 in which a set of access nodes 206 and optical permutors 204 are utilized to interconnect endpoints in a full mesh network in which each access node 206 is logically connected to each of M groups of core switches 209. As shown in this example, each server 215 communicates data to any other server via a set of parallel data paths, as described herein. Network 200 may be located within a data center that provides an operating environment for applications and services for customers coupled to the data center, e.g., by a content/service provider network (not shown), such as content/service provider network 7 of FIG. 1. In some examples, a content/service provider network that couples customers to the data center may be coupled to one or more networks administered by other providers, and may thus form part of a large-scale public network infrastructure, e.g., the Internet.

In this example, network 200 represents a multi-tier network having M groups of Z physical network core switches 202A-1-202M-Z (collectively, "switches 202") that are optically interconnected to O optical permutors 204-1-204-O (collectively, "OPs 204"), which in turn interconnect endpoints (e.g., servers 215) via Y groups of X access nodes 206A-1-206Y-X (collectively, "ANs 206"). Endpoints (e.g., servers 215) may include storage systems, application servers, compute servers, and network appliances such as firewalls and or gateways.

In the example of FIG. 5, network 200 includes three tiers: a switching tier 210 including switches 202, a permutation tier 212 including OPs 204, and an access tier 214A-214Y (herein, "access tier 214") including access nodes 206. Switching tier 210 represents a set of switches 202, such as core switches 22 of FIG. 1, and typically includes one or more high-speed core Ethernet switches interconnected in a switching topology to provide layer 2 packet switching for packets received on optical links from optical permutors 204 and forwarded by the switch fabric on optical links to optical permutors 204. Switching tier 210 may alternatively be referred to as a core switch tier/layer or a spine switch tier/layer.

Each optical permutor from OPs 204 receives light at a set of wavelengths from each of a set of multiple optical fibers coupled to the optical permutor and redistributes and outputs the wavelengths among each of another set of multiple optical fibers optically coupled to the optical permutor. Each optical permutor 204 may simultaneously input wavelengths from access nodes 206 for output to switches 202 and input wavelengths from switches 202 for output to access nodes 206.

In the example of FIG. 5, network 200 includes Z*M switches 202, O optical permutors 204, and Y*X access nodes 206. Access nodes 206 may represent examples of any host network accelerators (HNAs) or other similar interface devices, card or virtual device (e.g., router) for interfacing to optical permutors as described in this disclosure. Optical permutors 204 may represent examples of any optical permutor described in this disclosure.

Network 200 may interconnect endpoints using one or more switching architectures, such as multi-tier multi-chassis link aggregation group (MC-LAG), virtual overlays, and IP fabric architectures. Each of switches 202 may represent a layer 2 (e.g., Ethernet) switch that participates in the one or more switching architectures configured for network 200 to provide point-to-point connectivity between pairs of access nodes 206. In the case of an IP fabric, each of switches 202 and access nodes 206 may execute a layer 3 protocol (e.g., BGP and/or OSPF) to exchange routes for subnets behind each of the access nodes 206.

In the example of FIG. 5, switches 202 are arranged into M groups 209A-209M (collectively, "groups 209") of Z switches. Each of groups 209 has a set of switches 202 that are each optically coupled to a same optical permutor 204 via a respective optical fiber. Put another way, each of optical permutors 204 is optically coupled to switches 202 of one of groups 209. For example, group 209A includes switches 202A-1-202A-Z optically coupled to respective optical ports of optical permutor 204-1. As another example, group 209B includes switches 202B-1-202B-Z optically coupled to respective ports of optical permutor 204-2.

Each of access nodes 206 includes at least one optical interface to couple to a port of one of optical permutors 204. For example, access node 206A-1 is optically coupled to a port of optical permutor 204-1. As another example, access node 206A-2 is optically coupled to a port of optical permutor 204-2. In the example of FIG. 5, access nodes 206 are grouped into Y groups 211A-211Y (collectively, "groups 211") of X access nodes. Each of groups 211 has at least one access node 206 optically coupled to each of the O optical permutors 204. For example, group 211A has access node 206A-1 optically coupled to optical permutor 204-1, access node 206A-2 optically coupled to optical permutor 204-2, and so on through access node 206A-X optically coupled to optical permutor 204-O. As a consequence of this topology, each of groups 211 of access nodes for servers 215 has at least one optical coupling to each of optical permutors 204 and, by extension due to operation of optical permutors 204, has at least one optical coupling to each of switches 202.

In the example of FIG. 5, groups 211 of access nodes 206 include respective full meshes 220A-220Y of connections to connect access nodes 206 of each group pair-wise (point-to-point). Group 211A of access nodes 206A-1-206A-X, for instance, includes full mesh 220A of [X*(X−1)]/2 point-to-point connections so as to provide full connectivity between servers 215 and access nodes 206 for a given group of access nodes to which the servers connect. Put another way, with full mesh 220A, each access node in group 211A includes at least one point-to-point connection to source switching components and destination switching components in every other access node in group 211A, thereby allowing communications to or from switching tier 210 to fan-out/fan-in through the access nodes so as to originate from or be delivered to any of the servers 215 via a set of parallel data paths. Connections of full mesh 220A may represent Ethernet connections, optical connections or the like.

Full mesh 220A of group 211A enables each pair of access nodes 206A-1-206A-X ("access nodes 206A") to communicate directly with one another. Each of access nodes 206A may therefore reach each of optical permutors 204 either directly (via a direct optical coupling, e.g., access node 206A-1 with optical permutor 204-1) or indirectly via another of access nodes 206A. For instance, access node 206A-1 may reach optical permutor 204-O (and, by extension due to operation of optical permutor 204-O, switches 202M-1-202M-Z) via access node 206A-X. Access node 206A-1 may reach other optical permutors 204 via other access nodes 206A. Each of access nodes 206A therefore has point-to-point connectivity with each of switch groups 209. Access nodes 206 of groups 211B-211Y have similar topologies to access nodes 206A of group 211A. As a result of the techniques of this disclosure, therefore, each of access nodes 206 has point-to-point connectivity with each of switch groups 209.

The wavelength permutation performed by each of optical permutors 204 of permutation layer 212 may reduce a number of electrical switching operations required to perform layer 2 forwarding or layer 2/layer 3 forwarding of packets among pairs of access nodes 206. For example, access node 206A-1 may receive outbound packet data from a locally-coupled server 215 and that is destined for an endpoint associated with access node 206Y-1. Access node 206A-1 may select a particular transport wavelength on which to transmit the data on the optical link coupled to optical permutor 204-1, where the selected transport wavelength is permuted by optical permutor 204-1 as described herein for output on a particular optical link coupled to a switch of switching tier 210, where the switch is further coupled by another optical link to optical permutor 204-O. As a result, the switch may convert the optical signal of the selected transport wavelength carrying the data to an electrical signal and layer 2 or layer 2/layer 3 forward the data to the optical interface for optical permutor 204-O, which converts the electrical signal for the data to an optical signal for a transport wavelength that is permuted by optical permutor 204-O to access node 206Y-1. In this way, access node 206A-1 may transmit data to any other access node, such as access node 206Y-1, via network 200 with as few as a single intermediate electrical switching operation by switching tier 210.

Various examples have been described. These and other examples are within the scope of the following claims.

What is claimed is:

1. A network system comprising:
a plurality of servers;
a switch fabric comprising a plurality of core switches;
a plurality of access nodes, each of the access nodes coupled to a subset of the servers to communicate data packets with the servers; and
a plurality of optical permutation devices optically coupling the access nodes to the core switches by optical links to communicate the data packets between the access nodes and the core switches as optical signals,
wherein each of the optical permutation devices comprises:
a set of input optical ports and a set of output optical ports to direct optical signals between the access nodes and the core switches to communicate the data packets, the optical signals each comprising optical communications at a plurality (N) of different wavelengths, and
a plurality of optical multiplexor/demultiplexor slices, each configured to receive the optical signals from a different subset of the input optical ports and to optically direct the wavelengths from each of the optical signals of the different subset across the output optical ports to provide full-mesh optical connectivity between the input optical ports and the output optical ports without optical interference,
wherein each of the plurality of optical multiplexor/demultiplexor slices comprises one or more optical mux/demux chips, and wherein to optically direct the wavelengths, the one or more optical mux/demux chips of each of the optical multiplexor/demultiplexor slices is configured to:

receive an optical signal from each of the input optical ports within the different subset of the input optical ports coupled to the respective optical multiplexor/demultiplexor slice,
split the N wavelengths in each of the optical signals, and
forward the N wavelengths carried by each of the optical signals such that the output optical ports each carry a unique permutation of the input optical ports and the N wavelengths and where no single output optical port carries multiple optical communications having the same wavelength.

2. The network system of claim 1, wherein the access nodes, the core switches, and the optical permutation devices are configured to provide full mesh connectivity between any pairwise combination of the servers.

3. The network system of claim 1, wherein the access nodes, the core switches, and the optical permutation devices are configured to connect any pairwise combination of the access nodes by at most a single layer three (L3) hop.

4. The network system of claim 1, wherein the access nodes, the core switches, and the optical permutation devices are configured to provide a plurality of parallel data paths between each pairwise combination of the access nodes.

5. The network system of claim 4,
wherein, when communicating a packet flow of packets between a source server and a destination server, a first one of the access nodes coupled to the source server sprays the packets of the packet flow across the plurality of parallel data paths to a second one of the access nodes coupled to the destination server, and
wherein the second one of the access nodes reorders the packets into an original sequence of the packet flow and delivers the reordered packets to the destination server.

6. The network system of claim 5, wherein the first one of the access nodes coupled to the source server sprays the packets of the packet flow across the plurality of parallel data paths by directing each of the packets to a randomly or round-robin selected one of the parallel data paths.

7. The network system of claim 5, wherein the first one of the access nodes coupled to the source server sprays the packets of the packet flow across the plurality of parallel data paths by directing each of the packets to one of the parallel data paths selected based on available bandwidth of the one of the parallel data paths.

8. The network system of claim 1,
wherein the core switches are arranged as switch groups and the access nodes are arranged as access node groups,
wherein each of the optical permutation devices is optically coupled to one or more access nodes in each of the access node groups, and
wherein each of the optical permutation devices is optically coupled to the core switches of a different respective one of the switch groups.

9. The network system of claim 1,
wherein the plurality of input optical ports include sixteen input optical ports to receive the optical signals from the servers,
wherein the plurality of output optical ports include sixteen output optical ports to output the optical signals to the core switches, and
wherein the plurality of optical multiplexor/demultiplexor slices include four optical multiplexor/demultiplexor slices.

10. The network system of claim 1, wherein each of the access nodes comprises:
- a source component operable to receive traffic from a source server;
- a source switching component operable to switch source traffic to other source switching components of different access nodes or toward the core switches via the optical permutation devices,
- a destination switching component operable to switch inbound traffic received from other source switching components or from the cores switches via the optical permutation devices; and
- a destination component operable to reorder packet flows received via the destination switching component and provide the packet flows to a destination server coupled to the access node.

11. The network system of claim 1,
- wherein the access nodes, the core switches, and the optical permutation devices are configured to provide full mesh connectivity between any pairwise combination of the servers, and
- wherein the full-mesh connectivity is non-blocking and drop-free.

12. The network system of claim 1, wherein one or more of the access nodes comprise a storage device configured to provide network accessible storage for use by applications executing on the servers.

13. A method comprising:
interconnecting a plurality of servers of a data center by an intermediate network comprising:
- a switch fabric comprising a plurality of core switches;
- a plurality of access nodes, each of the access nodes coupled to a subset of the servers to communicate data packets with the servers; and
- a plurality of optical permutation devices optically coupling the access nodes to the core switches by optical links to communicate the data packets between the access nodes and the core switches as optical signals,
wherein each of the optical permutation devices comprises:
- a set of input optical ports and a set of output optical ports to direct optical signals between the access nodes and the core switches to communicate the data packets, the optical signals each comprising optical communications at a plurality (N) of different wavelengths, and
- a plurality of optical multiplexor/demultiplexor slices, each configured to receive the optical signals from a different subset of the input optical ports and to optically direct the wavelengths from each of the optical signals of the different subset across the output optical ports to direct a unique and non-interfering permutation of the N wavelengths on each of the output optical ports to provide full-mesh optical connectivity between the input optical ports and the output optical ports without optical interference, and
- wherein each of the plurality of optical multiplexor/demultiplexor slices comprises one or more optical mux/demux chips, and wherein to optically direct the wavelengths, the one or more optical mux/demux chips is configured to:
  - receive an optical signal from each of the input optical ports within the different subset of the input optical ports coupled to the respective optical multiplexor/demultiplexor slice,
  - split the N wavelengths in each of the optical signals, and
  - forward the N wavelengths carried by each of the optical signals such that the output optical ports each carry a unique permutation of the input optical ports and the N wavelengths and where no single output optical port carries multiple optical communications having the same wavelength, and
wherein the access nodes, the core switches, and the optical permutation devices are configured to provide a plurality of parallel data paths between each pairwise combination of the access nodes; and
communicating a packet flow between the servers including spraying, with one or more source access nodes from the plurality of access nodes, packets of the packet flow across the plurality of parallel data paths between the one or more source access nodes and one or more destination access nodes from the plurality of access nodes, and reordering, with the one or more destination access nodes, the packets into the packet flow and delivering the reordered packets.

14. The method of claim 13, wherein the access nodes, the core switches, and the optical permutation devices are configured to provide full mesh connectivity between any pairwise combination of the servers.

15. The method of claim 13, wherein the access nodes, the core switches, and the optical permutation devices are configured to connect any pairwise combination of the access nodes by at most a single layer three (L3) hop.

16. A method for forwarding communications within a packet-based network, the method comprising:
receiving packet-based communications with a set of input optical ports of an optical permutation device comprising a plurality of optical multiplexor/demultiplexor slices each comprising one or more optical mux/demux chips, wherein the set of input optical ports couple the optical permutation device to a set of access nodes positioned between the optical permutation device and a set of servers within the packet-based network;
permuting the packet-based communications across a set of output optical ports of the optical permutation device based on wavelength to provide full-mesh optical connectivity between the input optical ports and the output optical ports of the optical permutation device without optical interference; and
forwarding, with the optical permutation device and by the set of output optical ports, the permuted packet-based communications toward a set of one or more switches within the packet-based network,
wherein permuting the packet-based communications and forwarding the permuted packet-based communications includes:
- receiving, by the one or more optical mux/demux chips included within each of the optical multiplexor/demultiplexor slices, an optical signal from each of the input optical ports coupled to the respective optical multiplexor/demultiplexor slice,
- splitting, by the one or more optical mux/demux chips included within each of the optical multiplexor/demultiplexor slices, the plurality of wavelengths in each of the optical signals, and
- forwarding, by the one or more optical mux/demux chips included within each of the optical multiplexor/demultiplexor slices, the plurality of wavelengths carried by each of the optical signals such that the output optical ports each carry a unique permutation of the input optical ports and the plurality of wavelengths and where no single output optical port carries multiple optical communications having the same wavelength.

17. An optical permutation device comprising:
a plurality of optical input ports to receive respective optical signals, wherein the respective optical signals each comprise optical communications at a plurality (N) of different wavelengths;
a plurality of optical output ports to output optical signals; and
a plurality of optical multiplexor/demultiplexor slices each configured to receive the optical signals from a different subset of the optical input ports and to optically direct the N wavelengths from each of the optical signals of the different subset across the optical output ports to direct a unique and non-interfering permutation of the N wavelengths on each of the optical output ports,
wherein each of the plurality of optical multiplexor/demultiplexor slices comprises one or more optical mux/demux chips, and wherein to optically direct the wavelengths, the one or more optical mux/demux chips of each of the optical multiplexor/demultiplexor slices is configured to:
receive an optical signal from each of the optical input ports within the different subset of the optical input ports coupled to the respective optical multiplexor/demultiplexor slice,
split the N wavelengths in each of the optical signals, and
forward the N wavelengths carried by each of the optical signals such that the optical output ports each carry a unique permutation of the optical input ports and the N wavelengths and where no single optical output port carries multiple optical communications having the same wavelength.

18. The optical permutation device of claim 17,
wherein the plurality of optical input ports include sixteen input ports,
wherein the plurality of optical output ports include sixteen output ports, and
wherein the plurality of optical multiplexor/demultiplexor slices include four optical multiplexor/demultiplexor slices.

19. The optical permutation device of claim 17, wherein the optical permutation device is implemented as a photonic integrated circuit.

* * * * *